(12) United States Patent
Fan et al.

(10) Patent No.: US 8,576,867 B2
(45) Date of Patent: Nov. 5, 2013

(54) PIPELINE SCHEDULER WITH FAIRNESS AND MINIMUM BANDWIDTH GUARANTEE

(75) Inventors: Ruixue Fan, Princeton, NJ (US); Chi-Yu Lu, Suwanee, GA (US)

(73) Assignee: Juniper Networks, Inc., Sunnyvale, CA (US)

(*) Notice: Subject to any disclaimer, the term of this patent is extended or adjusted under 35 U.S.C. 154(b) by 40 days.

(21) Appl. No.: 13/460,723

(22) Filed: Apr. 30, 2012

(65) Prior Publication Data

US 2012/0213230 A1 Aug. 23, 2012

Related U.S. Application Data

(63) Continuation of application No. 12/851,317, filed on Aug. 5, 2010, now Pat. No. 8,189,597, which is a continuation of application No. 12/361,173, filed on Jan. 28, 2009, now Pat. No. 7,796,610, which is a continuation of application No. 11/336,890, filed on Jan. 23, 2006, now Pat. No. 7,499,454, which is a continuation of application No. 09/977,227, filed on Oct. 16, 2001, now Pat. No. 7,042,883.

(60) Provisional application No. 60/259,178, filed on Jan. 3, 2001.

(51) Int. Cl.
*H04L 12/28* (2006.01)

(52) U.S. Cl.
USPC ........... 370/419; 370/412; 370/230; 370/235; 370/468

(58) Field of Classification Search
None
See application file for complete search history.

(56) References Cited

U.S. PATENT DOCUMENTS

| | | | |
|---|---|---|---|
| 5,666,353 | A | 9/1997 | Klausmeier et al. |
| 5,787,086 | A | 7/1998 | McClure et al. |
| 5,831,971 | A | 11/1998 | Bonomi et al. |
| 5,867,663 | A | 2/1999 | McClure et al. |
| 6,104,700 | A | 8/2000 | Haddock et al. |
| 6,108,303 | A | 8/2000 | Fahmi et al. |
| 6,122,252 | A | 9/2000 | Aimoto et al. |
| 6,266,327 | B1 | 7/2001 | Hernandez-Valencia |
| 6,480,467 | B1 | 11/2002 | Hernandez-Valencia |

(Continued)

FOREIGN PATENT DOCUMENTS

| | | |
|---|---|---|
| JP | 10-229404 | 8/1998 |
| JP | 11-239151 | 8/1999 |
| JP | 2000-349765 | 12/2000 |
| JP | 2000-349828 | 12/2000 |

OTHER PUBLICATIONS

Naoki Matsuoka et al.; "A Study on Terabit Switch Architecture with QoS Control" Technical Report of IEICE, SSE2000-40, vol. 100, No. 79; May 2000; 8 pages (Abstract in English only).

*Primary Examiner* — Bob Phunkulh
(74) *Attorney, Agent, or Firm* — Harrity & Harrity, LLP

(57) ABSTRACT

A pipeline scheduler provides a minimum bandwidth guarantee by transporting cells from an input port to an output port in a two-phased approach. Cells that conform to a minimum cell rate (MCR) are selected from queues at the input port and arranged into supercells for transport to the output port, followed by nonconforming cells, to guarantee fairness by using scheduling modules to build the supercells first for conforming cells, and then for nonconforming cells. Reservation vectors are used to permit the same time slot of the next frame to be reserved by a first queue, and the same time slot of the following time frame to be held for reservation by a second queue, to ensure equal time slot access by the first and second queues over successive time frames.

19 Claims, 22 Drawing Sheets

(56) References Cited

U.S. PATENT DOCUMENTS

| | | |
|---|---|---|
| 6,539,024 B1 | 3/2003 | Janoska et al. |
| 6,570,883 B1 | 5/2003 | Wong |
| 6,618,379 B1 | 9/2003 | Ramamurthy et al. |
| 6,628,614 B2 | 9/2003 | Okuyama et al. |
| 6,633,540 B1 | 10/2003 | Raisanen et al. |
| 6,665,495 B1 | 12/2003 | Miles et al. |
| 6,678,247 B1 | 1/2004 | Bonaventure |
| 6,678,248 B1 | 1/2004 | Haddock et al. |
| 6,721,273 B1 | 4/2004 | Lyon |
| 6,831,922 B1 | 12/2004 | Shimada |
| 6,882,655 B1 | 4/2005 | Isoyama et al. |
| 6,885,639 B2 | 4/2005 | Kamiya |
| 6,904,015 B1 | 6/2005 | Chen et al. |
| 6,982,991 B1 | 1/2006 | Atoji |
| 7,027,457 B1 | 4/2006 | Chiussi et al. |
| 7,042,883 B2 | 5/2006 | Fan |
| 7,499,454 B2 | 3/2009 | Fan |
| 7,796,610 B2 | 9/2010 | Fan et al. |
| 8,189,597 B2 | 5/2012 | Fan et al. |
| 2001/0033581 A1 | 10/2001 | Kawarai et al. |
| 2001/0050916 A1 | 12/2001 | Krishna et al. |
| 2002/0110086 A1 | 8/2002 | Reches |
| 2002/0110134 A1 | 8/2002 | Gracon et al. |
| 2004/0064582 A1 | 4/2004 | Raghunath et al. |
| 2009/0135832 A1 | 5/2009 | Fan et al. |

| PARAMETER | MEANING | TYPICAL VALUE |
| --- | --- | --- |
| N | NUMBER OF INPUT AND OUTPUT PORTS | 64 |
| L | NUMBER OF INPUT AND OUTPUT LINES | 512 |
| R | NUMBER OF LINES PER PORT | 8 |
| K | NUMBER OF CLASSES | 8 |
| M | NUMBER OF SCHEDULING MODULES | 16 |
| S | NUMBER OF PIPELINE STAGES PER SCHEDULING MODULE | 1 |
| C | NUMBER OF CELLS PER SUPER-CELL | 8 |

PIPELINE SCHEDULER WITH FAIRNESS AND MINIMUM BANDWIDTH GUARANTEE

RELATED APPLICATIONS

This application is a continuation of U.S. patent application Ser. No. 12/851,317, filed Aug. 5, 2010, which is a continuation of U.S. patent application Ser. No. 12/361,173, filed Jan. 28, 2009, now U.S. Pat. No. 7,796,610, which is a continuation of U.S. patent application Ser. No. 11/336,890, filed Jan. 23, 2006, now U.S. Pat. No. 7,499,454, which is a continuation of U.S. patent application Ser. No. 09/977,227, filed Oct. 16, 2001, now U.S. Pat. No. 7,042,883, which claims priority from U.S. Provisional Patent Application No. 60/259,178, filed Jan. 3, 2001, the disclosures of which are incorporated herein by reference.

BACKGROUND OF THE INVENTION

1. Field of the Invention

The present invention relates to a method and system for scheduling traffic between an input port and an output port by constructing super-cells, and more specifically, to a method and system that uses crossbar switches and a credit system with a virtual-output queuing (VOQ) method.

2. Background of the Prior Art

In the related art diffserv traffic scheduling system, a fixed field within a datagram header indicates the class of the datagram, which in turn determines the per-hop-behavior (PHB) of the datagram receives at each diffserv router. Each class of traffic is an aggregate of individual traffic flows, and the aggregation of flows into classes occurs only at the boundary nodes of the network. Similarly, conditioning flows (i.e. shaping and policing) occur only at the boundary nodes.

Related art diffserv routers provide Quality of Service (QoS) by reserving bandwidth for different classes of traffic. In general, it is necessary to reserve sufficient bandwidth for the traffic in any given class to ensure that the high-QoS classes receive superior treatment. The above-described related art diffserv technique is scalable, since interior nodes concern themselves only with providing bandwidth guarantees to a small number of aggregate flows, and interior nodes do not shape or police traffic. Further, the prior art diffserv technique uses a naive algorithm for queuing.

However, the aforementioned related art scheduling method and system has various problems and disadvantages. For example, but not by way of limitation, related art interior routers do not perform compliance checks. Further, the related art system cannot handle non-conforming cells (i.e., series of cells having a total size greater than the available capacity for cell transport), and instead simply discards those cells, thus resulting in non-transport of certain cells by the related art scheduler.

Further, the related art scheduler sends full status information at each time slot, which results in a waste of system resources and an increased processing time. As a result of the naive algorithm used for queuing, cells may stay queued for an unbounded time when the number of cells in a queue is less than the threshold for processing those cells, which results in an extensive processing delay. Additionally, the related art system and method is unfair, due to the unfair treatment of cells at the input ports $1a \ldots 1N$, including during use of the related art round robin algorithm, which does not permit equal or prescribed weighting of access to the scheduler by all non-empty queues in an input port to overcome the related art fairness problem.

SUMMARY OF THE INVENTION

It is an object of the present invention to overcome the problems and disadvantages of the prior art method and systems.

It is another objective of the present invention to provide a scalable, work-conserving pipeline scheduling system having improved speed.

It is still another objective of the present invention to support multiples classes of traffic, each class having its own quality of service (QoS), and having a fixed-size super-cell as the transmission unit.

It is yet another objective of the present invention to provide a means for supporting non-conforming traffic, for traffic greater than the guaranteed rate.

It is another objective of the present invention to treat input and output ports fairly during the scheduling and reservation process.

To achieve these and other objects, a system for transporting data is provided, comprising (a) an input device that receives data from at least one input line and generates at least one supercell comprising a prescribed plurality of ATM cells, (b) a scheduling device that receives a request from said input device when said prescribed plurality of ATM cells has arrived at said input device, and generates a grant that instructs said input device to generate said at least one supercell, and (c) an output device that receives said at least one supercell via a crossbar switch and in accordance with said grant, wherein said supercell comprises one of only two classes and corresponds to said output device, and wherein a first of said two classes comprises selected ones of said plurality of ATM cells that conform to a minimum cell rate (MCR), and a second of said two classes comprises selected ones of said plurality of ATM cells that do not conform to said MCR.

Further, a method of transporting data is provided, comprising (a) determining whether cells received at an input port have a conforming status or a non-conforming status, (b) reserving a queue position for a conforming cell, followed by reserving a queue position for a non-conforming cell in said queue of said input port, until a predetermined number of said received cells has been reserved in said queue, (c) said input port generating and transmitting a request to a scheduler in accordance with results of said reserving step, (d) generating and transporting a supercell that comprises one of said conforming cells and said non-conforming cells in accordance with a grant received by said input device from said scheduler, and (e) receiving and deconstructing said supercell at an output device.

Additionally, a system for transporting data is provided, comprising an input port having a plurality of queues corresponding to a plurality of quality of service levels for a plurality of output ports, each of said queues receiving a plurality of cells of a first type and a second type, and a scheduling module at said input port that receives cells from said plurality of queues at said input port and constructs supercells in accordance with a reservation vector for each of said queues, wherein non-empty ones of said plurality of queues has fair access to said scheduler, and said supercells are transported to said output port in accordance with a grant that is generated based on a request from said input port.

Yet another method of transporting data is provided, comprising (a) receiving data at an input device and generating cells, (b) classifying said cells into one of a conforming class and a non-conforming class, wherein said conforming class comprises cells that conform to a minimum cell rate (MCR) requirement, and (c) transmitting a request from said input device to a scheduler. The method further comprises (d) in accordance with a grant from said scheduler, operating a scheduling module to provide fair access to a plurality of queues containing said cells at said input device, wherein said scheduling module controls transport of said cells from said input device to an output device, and (e) deconstructing said cells at said output device and outputting IP datagrams.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

FIG. 2 illustrates system parameters for the preferred embodiment of the present invention;

FIGS. 7 and 8 illustrate examples of applications of the reservation vectors according to the preferred embodiment of the present invention;

DETAILED DESCRIPTION OF THE INVENTION

Reference will now be made in detail to the preferred embodiment of the present invention, examples of which are illustrated in the accompanying drawings. In the present invention, the terms are meant to have the definition provided in the specification, and are otherwise not limited by the specification.

I. Overall System Description

A. System Architecture

Figure 1:
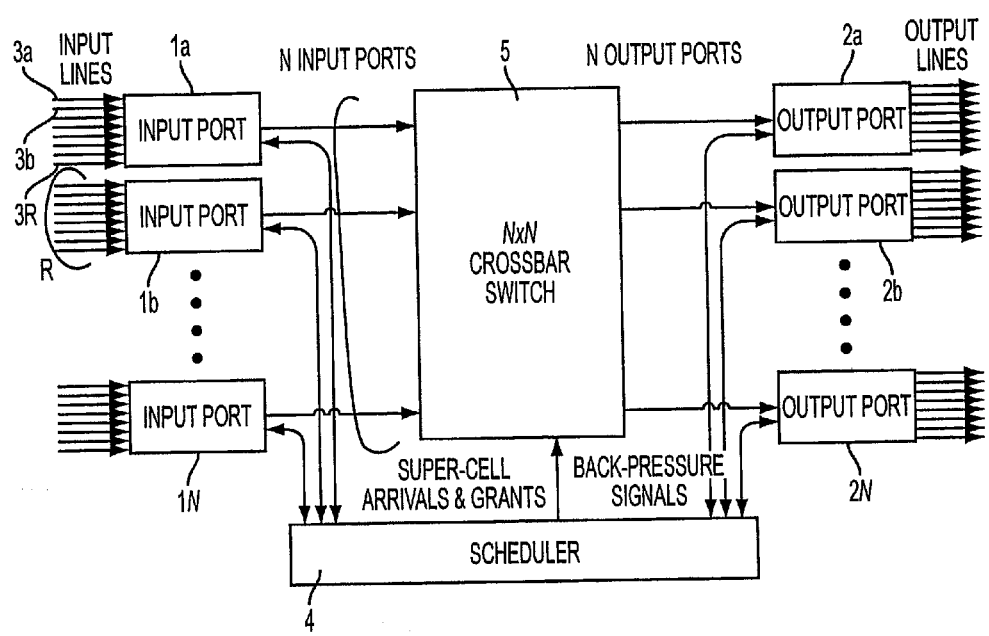
FIG. 1 illustrates a switching system according to a preferred embodiment of the present invention.

In this section, the overall architecture of the preferred embodiment of the present invention will be described, as illustrated in FIG. 1 and FIG. 2. FIG. 1 illustrates the system architecture of the preferred embodiment of the present invention. A switching system having N input ports $1a \ldots 1N$ and N output ports $2a \ldots 2N$ is provided. Each of the input ports $1a \ldots 1N$ and output ports $2a \ldots 2N$ supports R respective input or output lines $3a \ldots 3R$. Accordingly, the switching system illustrated in FIG. 1 supports a total of L=NR lines $(1 \ldots L)$. Alternatively, each line can be identified by its port number and the offset number at each port. For example, but not by way of limitation, if the input line number is R=8, then the $5^{th}$ offset of input port 9 is represented by the line number (9*8+5=77).

As illustrated in FIG. 1, the input and output ports $2a \ldots 2N$ communicate through a N×N crossbar switch 5 that supports either IP or ATM traffic. In the preferred embodiment of the present invention the traffic includes, but is not limited to, datagrams. A centralized scheduler 4 determines the communication pattern for the input and output ports $2a \ldots 2N$. At the input ports $1a \ldots 1N$, incoming ATM cells (e.g., datagrams with 53 bytes) that have the same output destination are aggregated into a larger and fixed sized super-cell (i.e., a C-cell). The supercells are then routed by the crossbar switch 5, repartitioned into standardized cells at the output port $2a \ldots 2N$, and then recombined into datagrams. The scheduler 4 is also connected to the crossbar switch 5, as discussed in greater detail further below.

Further, the scheduler may comprise a scheduling module that includes a computer-readable medium that is capable of storing a software program. The software program may implement the global round robin, dynamic round robin and global dynamic round robin processes, all of which are described in greater detail below, as well as additional methods, algorithms and processed described herein. Alternatively, hardware may be used in the scheduling module to implement to aforementioned methods.

FIG. 2 illustrates a list of system parameters and typical values according to the preferred embodiment of the present invention. In addition to the above-noted representations of system parameters N, L and R, K represents a total number of classes of traffic, M represents a total number of scheduling modules, S represents the number of pipeline stages per scheduling module, and C represents a total number of cells per super-cell. In the preferred embodiment of the present invention, exemplary values of system parameters include, but are not limited to, N=64, L=512, R=8, K=8, M=16, S=1 and C=8.

B. Queuing Structure

Figure 3:
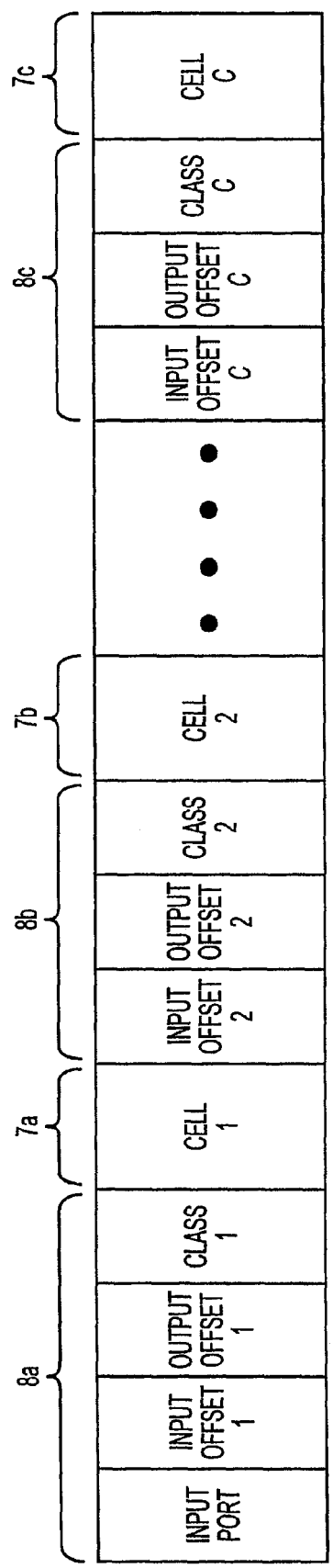
FIG. 3 illustrates a super cell format according to the preferred embodiment of the present invention.
Figure 4:
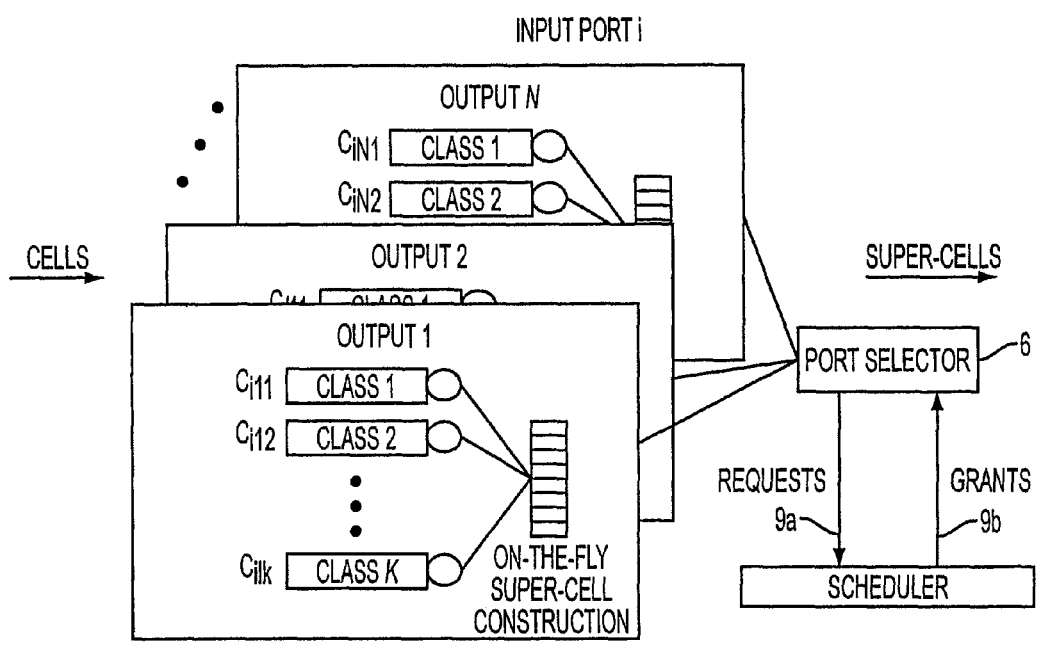
FIG. 4 illustrates a queue structure of an input port module according to the preferred embodiment of the present invention.

In this section, the queuing structure at the input buffer module will be described, as illustrated in FIGS. 3 and 4. As noted above, the preferred embodiment of the present invention transmits a supercell to the output ports $2a \ldots 2N$. The supercell is illustrated in FIG. 3. Each supercell includes cells $7a \ldots 7C$, wherein C cells are contained in the supercell, and corresponding labeling information $8a \ldots 8C$ for each supercell. The output line at the output port must know the input port, input offset, output offset, and class of each cell. In the preferred embodiment of the present invention, all cells in a supercell have the same input port, whereas each cell in a supercell may have its own input offset, output offset and class. However, as described further below, header information $8a \ldots 8C$ is not needed by the scheduler 4 to control the system, and the header information $8a \ldots 8C$ is merely added for the output line of the output port.

With respect to the queuing structure for Quality of Service (QoS) considerations, the switching system according to the preferred embodiment of the present invention supports K classes of traffic, each of which supports a QoS (e.g., a different service rate). Each input port module has KN queues (i.e., one queue for each <class, output port> pair). $KN^2$ input queues are subsequently aggregated into two virtual queues to reduce scheduler complexity, as described in greater detail further below.

The scheduler 4 only schedules $2N^2$ input queues due to the aggregation of the K physical queues for each <input port, output port> pair into 2 virtual queues. Each of the input ports $1a \ldots 1N$ sends the status for each of its virtual queues, which are independent of the class K, to the scheduler 4, which selects a partial permutation (i.e., a partial set of selection of input-output connections) to be routed at each time slot. The scheduler 4 chooses virtual queues to service in each time slot, such that no more than one super-cell is transmitted from each input port scheduling module to the crossbar switch 5 per time slot, and no more than one super-cell is transmitted to each output port at a time step. The scheduler 4 can either control the crossbar switch 5, or output port addresses can be attached to the headers of selected super-cells (i.e., self-routing is performed).

FIG. 4 illustrates the queue structure of an input port i module according to the preferred embodiment of the present invention. For each input port i and output port j, there will be K queues representing each of the classes of traffic (i.e., QoS). When a datagram arrives at an input router, the next hop and class are determined, the datagram is partitioned into cells, and the cells are then sent to the appropriate queues. A port selector 6 selects an output port for the queues at the input port i in accordance with information received in the incoming data transmission.

As also illustrated in FIG. 4, the ATM cells arrive at the input ports $1a \ldots 1N$, and cells of the same class and output port are buffered in separate queues until enough cells exist to create a full potential super-cell at a queue. Next, the scheduler 4 is informed of the arrival of the super-cell, including information about the potential super-cell's input port, output port, and conforming/non-conforming status. A potential super-cell is conforming when all of its cells are conforming, and non-conforming when all of its cells are non-conforming. The scheduler 4 maintains variables holding the number of received but unserviced requests. As a result, a total of $2N^2$ variables are required: $N^2$ for conforming traffic and $N^2$ for non-conforming traffic.

C. Input Buffer Module Processes

1. Method Descriptions

Figure 5A:
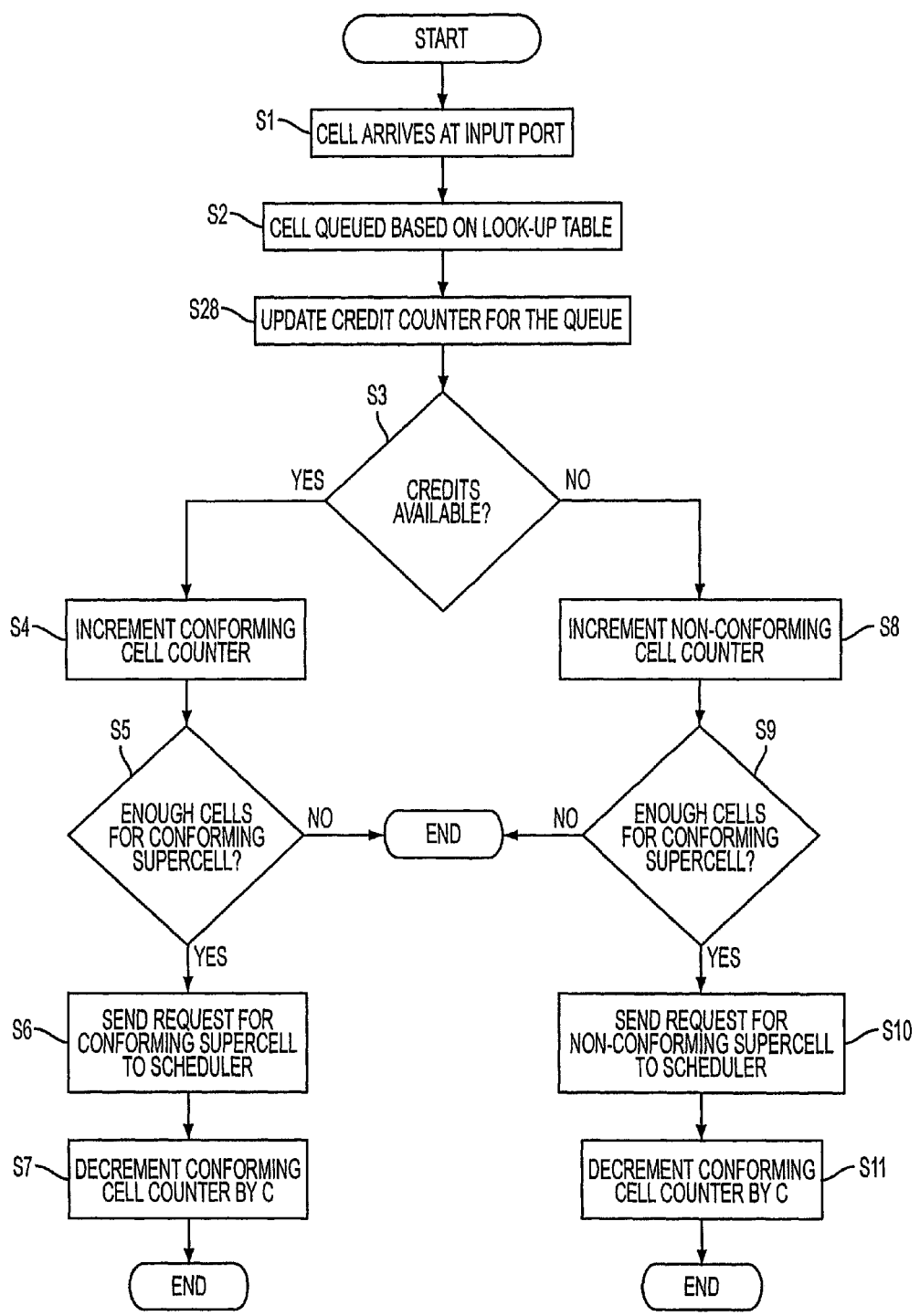
FIGS. 5(a) and 5(b) respectively illustrate a method of queuing cells and the operation of the input buffer according to the preferred embodiment of the present invention.
Figure 5B:
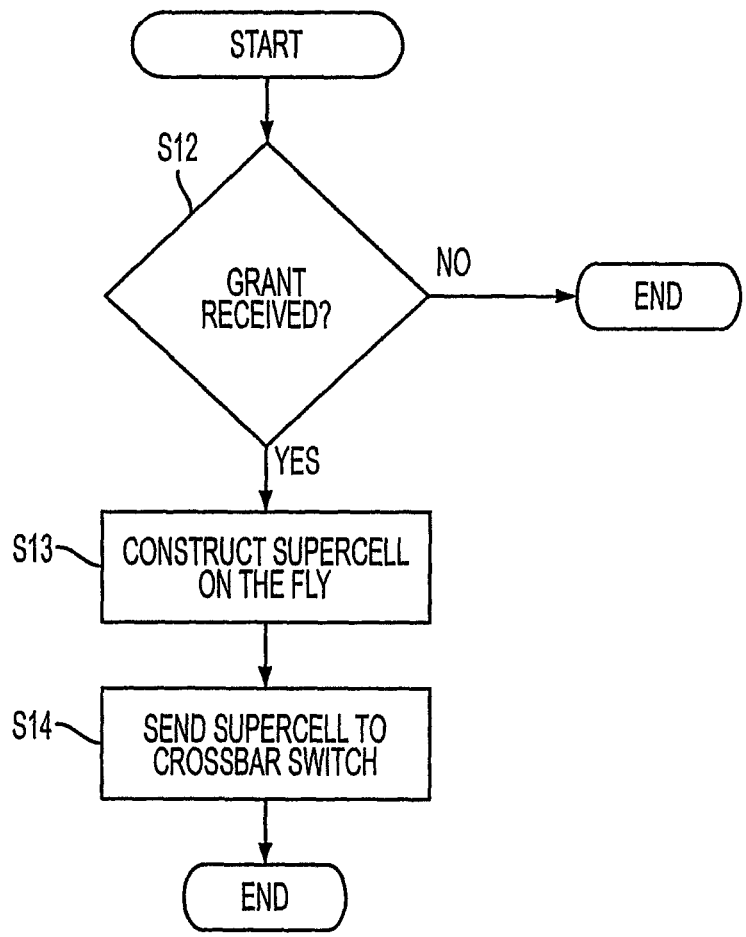

FIGS. 5(a) and 5(b) illustrate a method of queuing cells and the operation of the input buffer according to the preferred embodiment of the present invention. As illustrated in FIG. 5(a), in a first step S1, a cell arrives at one of the input ports. Then, at step S2, a lookup table is accessed to determine the class and output port destination for the cell that arrived at step S1, and the cell is queued. As explained in greater detail further below, the credit counter is updated for the queue at step S28.

At step S3, a determination is made as to whether credits are available. If credits are available, then the cell may be considered conforming, and if credits are not available, then the cell may be considered non-conforming. If credits are available, then a conforming cell counter is incremented at step S4, and at step S5, it is determined whether enough cells have accumulated for a complete conforming supercell, by checking the conforming cell counter. If it is determined in step S5 that there are not enough cells for a supercell, then the process ends. However, if there are enough cells for a supercell, a request is sent to the scheduler for a conforming supercell at step S6, and in step S7, the conforming cell counter is decremented by C, which is the number of cells in a supercell. The process is then complete for the arriving, conforming cell at the input buffer.

If the determination is made at step S3 that the credits are not available, the cell may be considered nonconforming. Accordingly, at step S8, the nonconforming cell counter is incremented. In step S9, it is determined whether enough cells have accumulated for a complete non-conforming supercell, by checking the non-conforming cell counter. If not enough cells have accumulated, the process ends. However, if enough cells have accumulated, then a request for a non-conforming supercell is sent to the scheduler in step S10. At step S11, the nonconforming cell counter is decremented by C, and the process is then complete for the arriving, non-conforming cell at the input buffer.

FIG. 5(b) illustrates the process according to the preferred embodiment of the present invention at the input buffer module, for construction of the supercells. As noted above, a request is sent to the scheduler once it has been determined that there are enough cells for either a conforming or non-conforming supercell. At step S12, the input buffer module determines whether a grant has been received. If the grant has not been received, the process ends. However, if a grant has been received, then at step S13, a supercell is constructed on the fly, and at step S14, the supercell is sent to the crossbar switch.

An exemplary method for performing on-the-fly super-cell construction according to the preferred embodiment of the present invention illustrated in FIG. 5(b) is described below. Consider the K class queues from input port i to output port j, having the fixed priority scheme. A scanning device inspects the status of all queues, and selects one cell to add within a cell time that is equal to the slot time divided by C. As a result, within C cell times, C cells can be selected, and the super-cell will be ready for routing after C cell times. While the scanning device incurs a single slot time latency to construct the super-cell once a transmission grant has arrived from the scheduler 4, the scanning device provides full flexibility in constructing the super-cell.

Let $z_{ijk}$ represent the number of credits (in units of cells) allocated to the corresponding queue at each time slot. In general, $z_{ijk}$ will be a fractional value. For example, but not by way of limitation, if the class-k flow from input port i to output port j utilizes about 20% of the maximum bandwidth of an input port, $z_{ijk}$ is set to about $0.2*C_{port}$, where $C_{port}$ represents the total capacity of an output port. While it would be theoretically advantageous to increase credits at each time slot using the formula $c_{ijk}=c_{ijk}+z_{ijk}$, it is difficult to update the necessary variables at such a high frequency. To reduce the updating cost, the present invention updates credits only when a new cell arrives at a queue. As a result, each queue maintains an additional variable indicating the last update time of the credit variable for that queue. When a new cell arrives, the number of time slots since the last credit update is calculated, and the credit variable is updated.

To prevent the unbounded growth of credits in the preferred embodiment of the present invention, it is necessary to enforce a maximum value for each $c_{ijk}$. Further, because a wrap-around problem may occur due to an extended time between queue arrivals, it may not be possible to represent the number of time slots since the last arrival. To overcome the wrap-around problem, the preferred embodiment of the present invention includes a low-overhead background update mechanism.

To determine the time at which the existence of a potential super-cell is signaled, one of the input ports $1a \ldots 1N$ signals the scheduler 4 when either C conforming cells or C non-conforming cells are accumulated in a queue.

The process of supercell construction with respect to the input buffer module, and associated input queuing structure, is then completed.

2. Exemplary Pseudo-Code

Exemplary pseudo-code for the input port according to the preferred embodiment of the present invention illustrated in FIGS. 5(*a*) and 5(*b*) follows:

```
/* Pseudo-code for input port */
/* Incoming super-cells phase */
if (new cell arrives at q_ijk) {
    c_ijk = c_ijk + t * z_ijk;   /* t is the number of slot times since last
                                    super-cell arrival */
    if (c_ijk >= 1) {            /* conforming cell arrived */
        v_ijk = v_ijk + 1;
        c_ijk = c_ijk − 1;
        V_ij = V_ij + 1;
        if (V_ij == C) {
            V_ij = V_ij − C;
            inform scheduler of conforming super-cell from i to j;
        }
    }
    else {                       /* non-conforming cell arrived */
        w_ijk = w_ijk + 1;
        W_ij = W_ij + 1;
        if (W_ij == C) {
            W_ij = W_ij − C;
            inform scheduler of non-conforming super-cell from i to j;
        }
    }
}
/* Pseudo-code for input port */
/* Grant handling phase */
if (receive a grant for i to j) {
    for (each q_ijk) { /* look for conforming cells */
        if (super-cell is not complete) {
            if (v_ijk > 0) {
                add cells from q_ijk to super-cell;
                decrement v_ijk appropriately;
            }
        }
    }
    for (each q_ijk) { /* look for non-conforming cells */
        if (super-cell is not complete) {
            if (w_ijk > 0) {
                add cells from q_ijk to super-cell;
                decrement w_ijk appropriately;
            }
        }
    }
}
```

To implement the above-described pseudo-code, a Round-Robin type of algorithm constructs the super-cell on the fly when transmission is granted by the scheduler 4, similar to those discussed above. Alternatively, a first-in, first-out (FIFO) queue can be used to construct the super-cell. In the FIFO queue method, whenever a cell arrives, the queue number of the cell is queued in the FIFO queue. Conforming traffic has its own FIFO queue and non-conforming traffic also has its own FIFO-queue. When the input buffer receives a grant from the scheduler 4, the class queues are emptied in the FIFO order.

To implement the optional FIFO method, the following pseudo-code may be implemented, where $FV_{ij}$ is the FIFO that holds a queue number of conforming cells from input port i to output port j and $FW_{ij}$ is the FIFO that holds the queue number of non-conforming traffic from input port i to output port j:

```
/* Pseudo-code for input port using FIFO */
/* Incoming super-cells phase */
if (new cell arrives at q_ijk) {
    c_ijk = c_ijk + t * z_ijk;   /* t is the number of slot times since last
                                    super-cell arrival */
    if (c_ijk >= 1) {            /* conforming cell arrived */
        v_ijk = v_ijk + 1;
        c_ijk = c_ijk − 1;
        V_ij = V_ij + 1;
        add cell queue number) to FIFO FV_ij;
        if (V_ij == C) {
            V_ij = V_ij − C;
            inform scheduler of conforming super-cell from i to j;
        }
    }
    else {                       /* non-conforming cell arrived */
        w_ijk = w_ijk + 1;
        W_ij = W_ij + 1;
        add cell queue number) to FIFO FW_ij;
        if (W_ij == C) {
            W_ij = W_ij − C;
            inform scheduler of non-conforming super-cell from i to j;
        }
    }
}
/* Pseudo-code for input port */
/* Grant handling phase */
if (receive a grant for i to j) {
    for (each cell's queue number in the head of FIFO FVij) ) {
        /* look for conforming cells */
        if (super-cell is not complete) {
            remove a cell from q_ijk according to queue number in the head of
            FIFO FVij ) and add to super-cell;
            decrement v_ijk appropriately;
        }
    }
    for (each cell's queue number in the head of FIFO FWij) ) {
        /* look for non-conforming cells */
        if (super-cell is not complete) {
            remove a cell from q_ijk according to queue number in the head of
            FIFO FWij )and add to super-cell;
            decrement w_ijk appropriately;
        }
    }
}
```

D. Scheduler Virtual Queuing Structure

This section discusses the scheduler virtual queuing structure with multiple chips. More specifically, the activities occurring at the scheduler with respect to the input buffer module are described.

Figure 6:
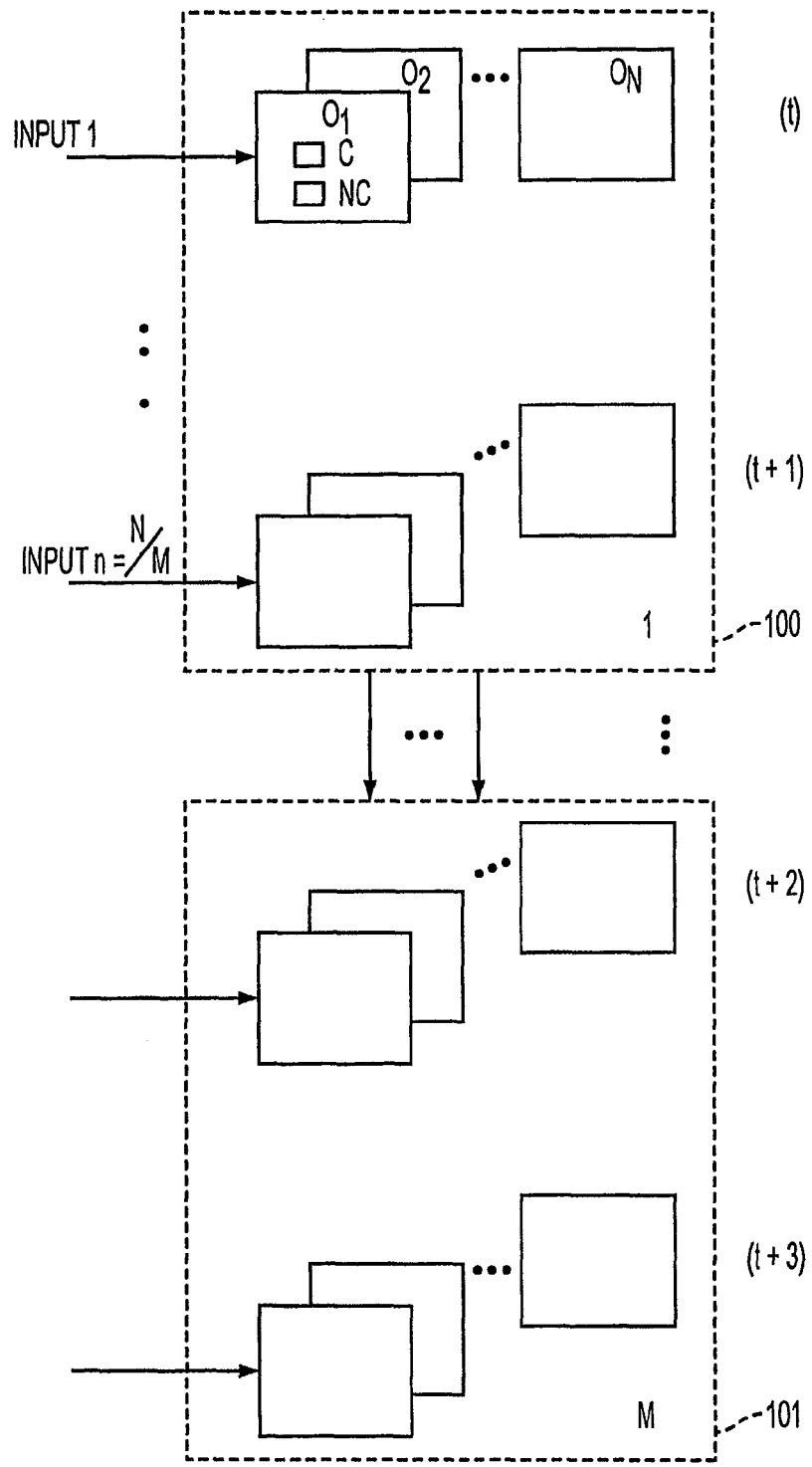
FIG. 6 illustrates a pipeline scheduler architecture according to the preferred embodiment of the present invention.

FIG. 6 illustrates the structure of the scheduler according to the preferred embodiment of the present invention. A plurality of chips 100, 101 are provided (e.g., 1 . . . M), and each of the chips 100, 101 is capable of handling multiple input ports $1a \ldots 1n$, where n=N/M, as described in greater detail below. There is a counter for conforming and nonconforming super-cells for each output port per input port. As illustrated in FIG. 6, which is an exemplary description of the scheduling module of the present invention, but is not limited thereto, the first schedule module operates for time (t), the second schedule module operates to time (t+1), the third schedule module operates for time (t+2) and the fourth schedule module operates for time (t+3). Further, there are connections between chips 100 and 101, such that messages can be sent to ensure fairness and guarantee minimum bandwidth, as described in greater detail further below.

The scheduler selects a set of input-output connections for each slot, under the constraint that no input port sends more than one super-cell and no output port receives more than one super-cell. To make the scheduler scalable to N—the number of input or output ports, a distributed scheduler with pipeline architecture is necessary. In this pipeline scheduler architecture, the scheduling task of an N×N system is distributed among a number (e.g., M) Scheduler Modules (SMs), N/M input ports per module. These SMs are connected in a round-robin ring fashion. At a given time slot, each SM receives scheduling messages from its upstream neighbor, makes scheduling decisions, and passes the possibly altered scheduling messages to its downstream neighbor. Since each SM makes independent scheduling decisions from all others, it needs to make scheduling decisions for a time slot that is different from that of others. Thus, a frame of M time slots is needed for this distributed scheduler to complete the M scheduling slots for N ports.

Figure 11:
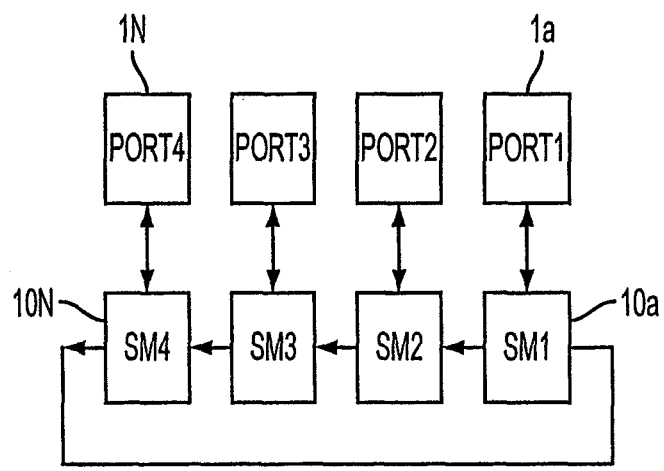
FIG. 11 illustrates a round-robin connection of a distributed scheduler architecture according to the preferred embodiment of the present invention.
Figure 11:
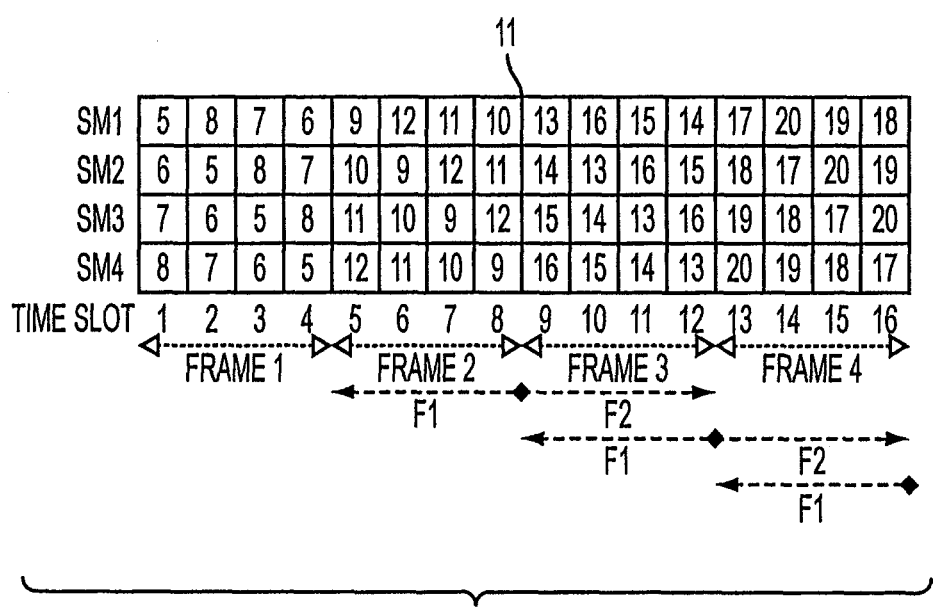

FIG. 11 illustrates a 4×4 system with 4 SMs. A scheduling window is also used to show that each SM schedules for its input ports in a different time slot. The number in each box of this window designates the time slot that the corresponding SM (in the vertical axis) schedules for its input at the corresponding time slot (in the horizontal axis). For example, but not by way of limitation, at time slot 1, SM1 makes decisions of time slot 5 and output port 2 for input port 1, SM2 makes decisions of time slot 6 and output port 2 for input port 2, SM3 makes decisions of time slot 7 and output port 2 for input port 3, and SM4 makes decisions of time slot 8 and output port 3 for input port 4. One time slot later, each SM will try to schedule for its input port for the time slot received from its upstream SM. After a frame of 4 time slots, all SMs would have tried to schedule for all the input ports for all 4 time slots.

E. Delay of a Pipelined Scheduler

1. Delay Concepts

To further explain the pipeline implementation, a simple hardware model is provided, with a scheduling module comprising S pipeline stages, where the value of S depends on the implementation, but will be an integer in the range $1<=S<=N/M$. In general, each pipeline stage handles a block of N/M/S input ports. The pipeline stages pass reservation vectors to each other. The reservation vector represents the partial permutation to be routed at some point in the future. It simply indicates which output ports have already been reserved for that slot, and therefore only N bits are needed.

In one slot time, each pipeline stage is able to make reservations (if possible) for each of its N/M/S input ports, and pass the reservation vector to its neighboring pipeline stage. With this approach, all input ports are allowed to attempt to make reservations in a reservation vector with a latency of SM time slots. To increase the throughput of the system, a scheduling window is started by allowing each reservation module to start with a reservation vector. In this way, SM reservation vectors can be calculated in SM slot times.

Thus, the complexity of the scheduler is increased by considering the fact that each input port has two chances to see each reservation vector. The first time it sees a reservation vector, it should try to reserve only conforming traffic. The second time it sees the reservation vector, it can also try to reserve non-conforming traffic. Having two scheduling phases, the scheduler doubles the latency to 2SM time slots; that is, it requires 2SM time slots to schedule output for every SM time slots. This is insufficient, since we need to schedule one set of output port reservation every time slot. To overcome this problem, the resources at each scheduling module are doubled; each scheduling module must handle two reservation vectors in each slot time.

At time t=1, we start with SM reservation vectors distributed over the SM pipeline stages. At time t=SM, those vectors have reservations for conforming traffic. At time t=SM+1, we start up a new batch of SM reservation vectors, while we let the original batch start on its second pass through the pipeline. Thus, at each slot time each pipeline stage is handling conforming reservations for one vector and non-conforming reservations for another. The overall latency to schedule a vector is 2SM, but the system outputs SM vectors (calculated in this scheduling window but for use in the next scheduling window) every SM slots, resulting in the required throughput.

To more accurately model the restrictions of current hardware, it is now assumed that it takes one slot time to transfer a reservation vector between modules. Considering only a single vector, the latency has increased to 2(SM+M). Using the technique described in the previous paragraph becomes infeasible, since it would only calculate SM partial permutations every SM+M time slots. It is necessary to be working on 2(SM+M) reservation vectors at any given time. To achieve this goal, a transfer time is equivalent to a pipeline stage for which no work is done. At the beginning of a batch of reservation vectors, the transfer stages also start with reservation vectors. Effectively, each batch starts with SM+M reservation vectors instead of SM. To reiterate, the latency has become 2(SM+M), and the system outputs SM+M reservation vectors every SM+M time slots.

2. Exemplary Description

Figure 7:
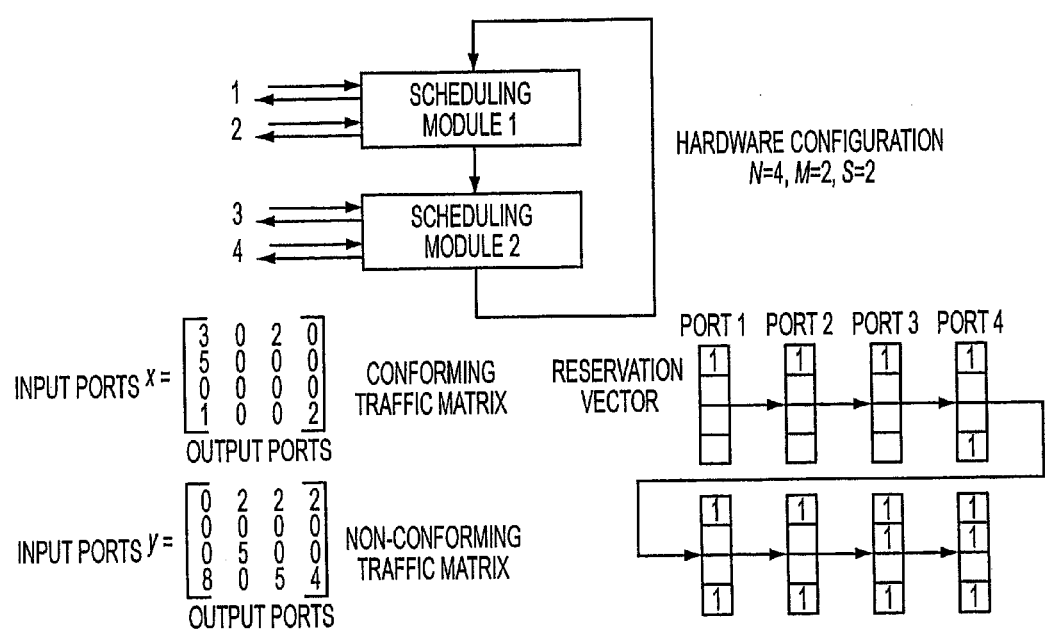

A small example of the scheduling algorithm with N=4, M=2, and S=2 can be found in FIG. 7, which emphasizes the manipulation of a single reservation vector. The matrices x and y hold the $x_{ij}$ and $y_{ij}$ denoting the number of super-cells waiting for transfer for conforming and non-conforming traffic, respectively. In this example these values do not change as the reservation vector passes through the scheduler, though in general this does not have to be the case. The example also assumes communication between modules does not incur extra delay. In the first pass through the pipeline, input port 1 reserves output port 1 and input port 4 reserves output port 4. In the second pass, input port 3 reserves output port 2. Note that a given input port can make only one reservation in a given time slot. The latency to schedule a vector is 2SM=8 time slots.

Figure 8:
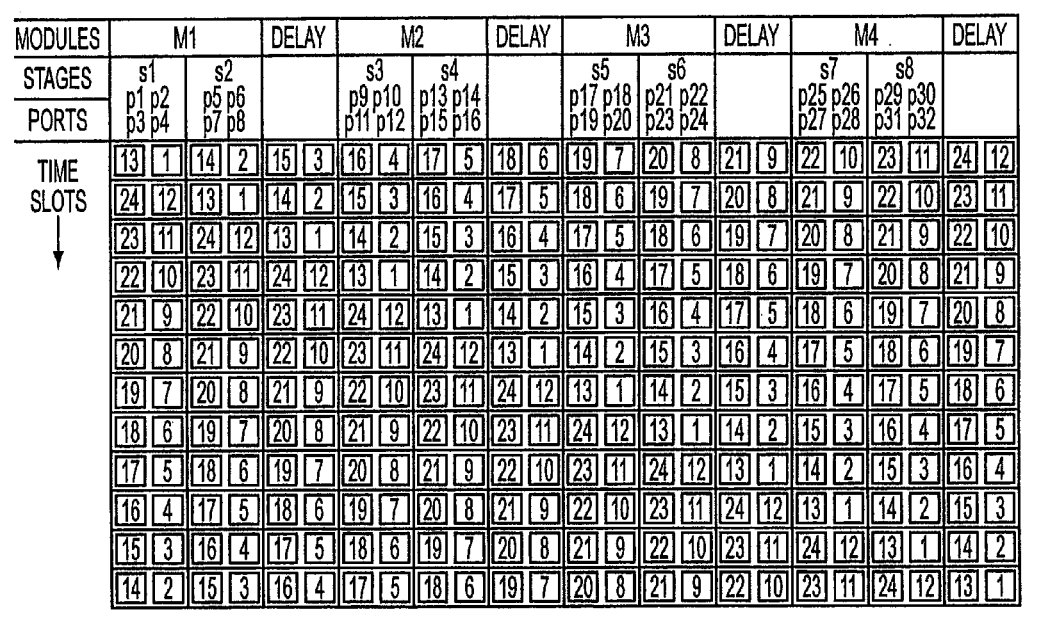

FIG. 8 shows a larger example (N=32, M=4, and S=2) that emphasizes the movement of reservation vectors within a scheduling window. Delays between modules exist, so the scheduler outputs SM+M=12 reservation vectors every 12 slots. In the shown window, the reservation vectors for time slots 1-12 can reserve for either conforming or non-conforming traffic, since in a previous processing operation conforming-only reservations were made for these time slots. These are shown as boxes with dotted lines. The reservation vectors for time slots 13-24 can reserve for new conforming traffic only. These are shown as boxes with solid lines.

F. Scheduler Methods

Figure 9:
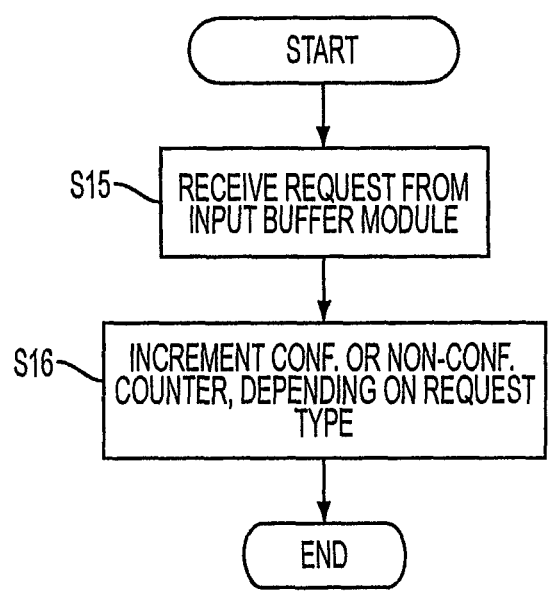
FIG. 9 illustrates a method of the scheduler processing information from the input buffer module according to the preferred embodiment of the present invention.

FIG. 9 illustrates a method of the scheduler processing information from the input buffer module according to the preferred embodiment of the present invention. In a first step S15, a request is received from the input buffer module. As noted above, depending on whether credits are available, the request may be for a conforming or non-conforming supercell. At step S16, queue length for either the conforming or non-conforming queue is incremented, based on the type of request. The scheduler then makes the necessary reservation (which is discussed in greater detail further below) by scheduling the cell at time slot t (this is done at different time slots for each of the different inputs) for output. Then, a supercell is scheduled for the input and a grant is sent to the input buffer module, for each input.

Once the input buffer module receives the grant, the process is performed, as illustrated in FIG. 5(b) and discussed in greater detail further above.

Figure 10:
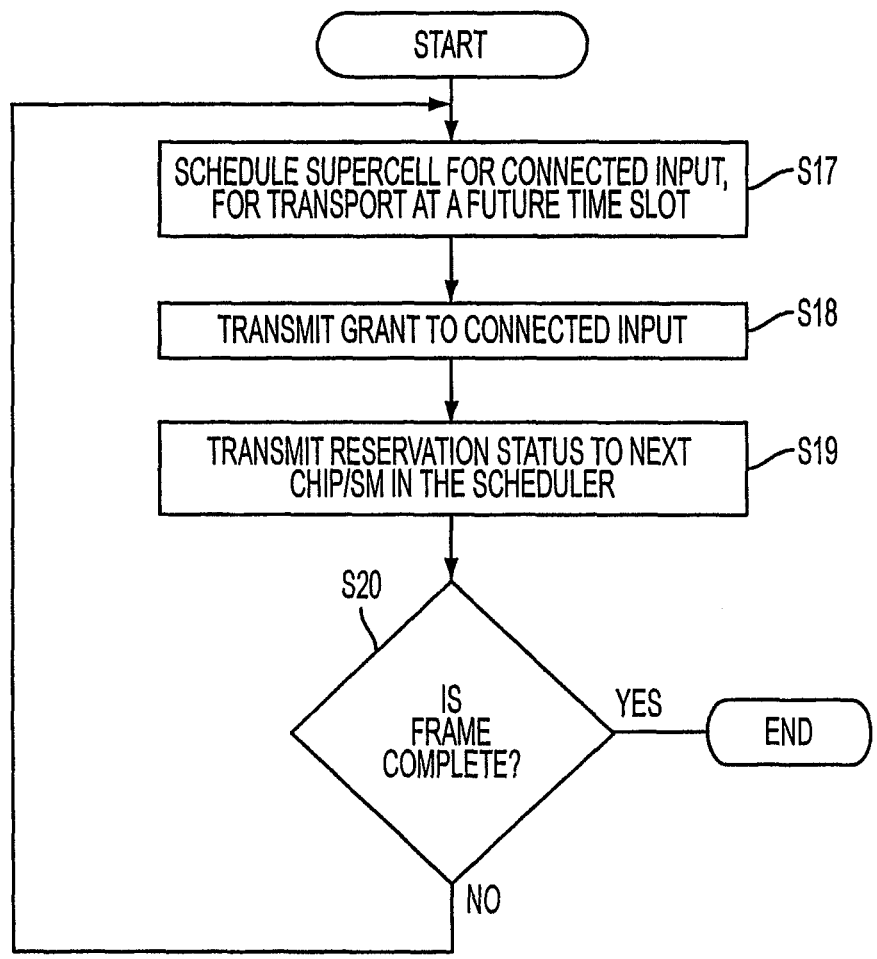
FIG. 10 illustrates a method of scheduling supercells for transport, according to the preferred embodiment of the present invention.

FIG. 10 illustrates a method of the scheduler scheduling supercells for transport, according to the preferred embodiment of the present invention. In a first step S17, a supercell is scheduled for connected input, for transport at a time slot t in the future. Then, at step S18, the grant is transmitted to one of the connected inputs. At step S19, the reservation status is transmitted to the next chip (i.e., scheduling module) in the scheduler. At step S20, a check is performed to determine if the frame is complete. If so, then the process ends. If the frame is not complete, then steps S17-S20 are repeated until it is determined that the frame has been completed in step S20.

II. The Fairness Problem and the Pipeline Scheduler

In the related art pipeline scheduler, the operation of which is described in greater detail in Section I above, there exists a problem known as the fairness problem. The basis of the fairness problem is the fact that not all input ports and/or output ports share available time slots equally.

Accordingly, fairness can be defined by fair access of a scheduling module to a share of the total available capacity. Fairness can be further divided based on being equally weighted or not equally weighted. For example, but not by way of limitation, if all scheduling modules having traffic are guaranteed equal access in terms of total capacity, then equal fairness has been guaranteed. For example, equal fairness exists when active schedule modules (SM's) that are carrying traffic each have equal access to the total capacity, even with the input and output bottleneck situations described in greater detail below.

Alternatively, fairness can also be weighted. If a particular scheduling module is to be given priority due to heavy traffic or for any other reason, then that scheduling module will be given a greater weight. For example, if a first SM is more heavily weighted than a second SM (e.g., 75/25), then the first SM will receive a proportionately larger share of access (e.g., 75%) to the total capacity than the second SM (e.g., 25%).

Further, the concept of weighting is not limited to comparison between the two scheduling modules in the aforementioned example, and can be used to distribute weighting between all active scheduling modules that are carrying traffic.

A. Bottleneck at the Output Port

Fairness problems can occur due to bottlenecks at the input port and/or the output port. If a particular input port has queues for many different output ports, there is a problem in the allocation of transmission capacity among the queues. If allocation is not proper, then there can be a collision between outputs if the order of output port selection is not performed fairly. Further, not maintaining output fairness can result in congestion at busy output ports. The preferred embodiment of the present invention overcomes the related art bottleneck problem at the output port, as discussed in greater detail below.

An example of the output bottleneck problem follows. First, it is assumed that the related art sequence of scheduling for a particular time slot with respect to the time frame is always fixed and unfair among the scheduler modules (SMs) due to the topology of connection of the SMs in the distributed architecture. As illustrated in FIG. 11, which is described in greater detail further below, the scheduling order is always SM1→SM2→SM3→SM4 for time slot 5, 9, 13, and etc. (i.e., the first time slot of each time frame).

For example, but not by way of limitation, SM1 and SM2 have no traffic, and both SM3 and SM4 have traffic that goes to output port 1 only. A prior art scheduler would let SM3 consume all 3 time slots 5, 6, and 7 of time frame 2, and SM4 would only get time slot 8. Thus, SM3 gets ¾ of the total capacity while SM4 only gets ¼ of the total capacity. That pattern will continue for the remainder of the time frames of operation. In the above-described situation, ideally, the first and second SMs should each get 50% of the total capacity. As a result, SM4 does not have fair access with respect to SM3. The above-mentioned problem is referred to as the output port bottleneck problem.

B. Bottleneck at the Input Port

Additionally, bottleneck problems can also occur at the input port. For example, but not by way of limitation, when an input port is treated unfairly with respect to an output port (i.e., total capacity is not allocated fairly between multiple scheduler modules having different input ports and the same output port), then congestion can occur at some of the input ports. The preferred embodiment of the present invention overcomes the related art bottleneck problem at the input port, as discussed in greater detail below.

III. Achieving Equal Fairness (Global Dynamic Round Robin)

As noted above, the fairness problem in the pipeline scheduler can be overcome by having either equal fairness or weighted fairness. To achieve equal fairness, a global dynamic round robin (GDRR) is applied. This section describes overcoming the aforementioned related art output port and input port bottleneck problems separately, and then the combined, overall solution to the bottleneck problem that achieves equal fairness. An example is also provided.

A. Overcoming the Output Bottleneck Problem (Global Round Robin)

As discussed in the foregoing section, the output bottleneck problem occurs when multiple input ports send an output to the same output port. To overcome this problem, the Global Round Robin (GRR) is applied. This section discusses the application of the GRR.

In the related art, to overcome the speed bottleneck problem at the output, a round-robin scheme is used to implement the aforementioned example. As illustrated in FIG. 11, in a round robin (RR) scheme, each scheduler module SM1 . . . SM4 schedules for a given time slot one frame in advance of the current frame to generate a reservation status vector. Four super cells can be transmitted by each SM in a given time frame. Thus, at TS1, SM1 reserves TS5, SM2 reserves TS6, and so on. AT TS2, SM2 has the opportunity to reserve TS5 for frame 2, if it has not yet been reserved by SM1, SM3 has the same opportunity with TS6, SM4 has the same opportunity with TS7, and SM1 has the same opportunity with TS8. Thus, as noted above, a fairness problem results from this basic related art pipeline scheduler.

Figure 12A:
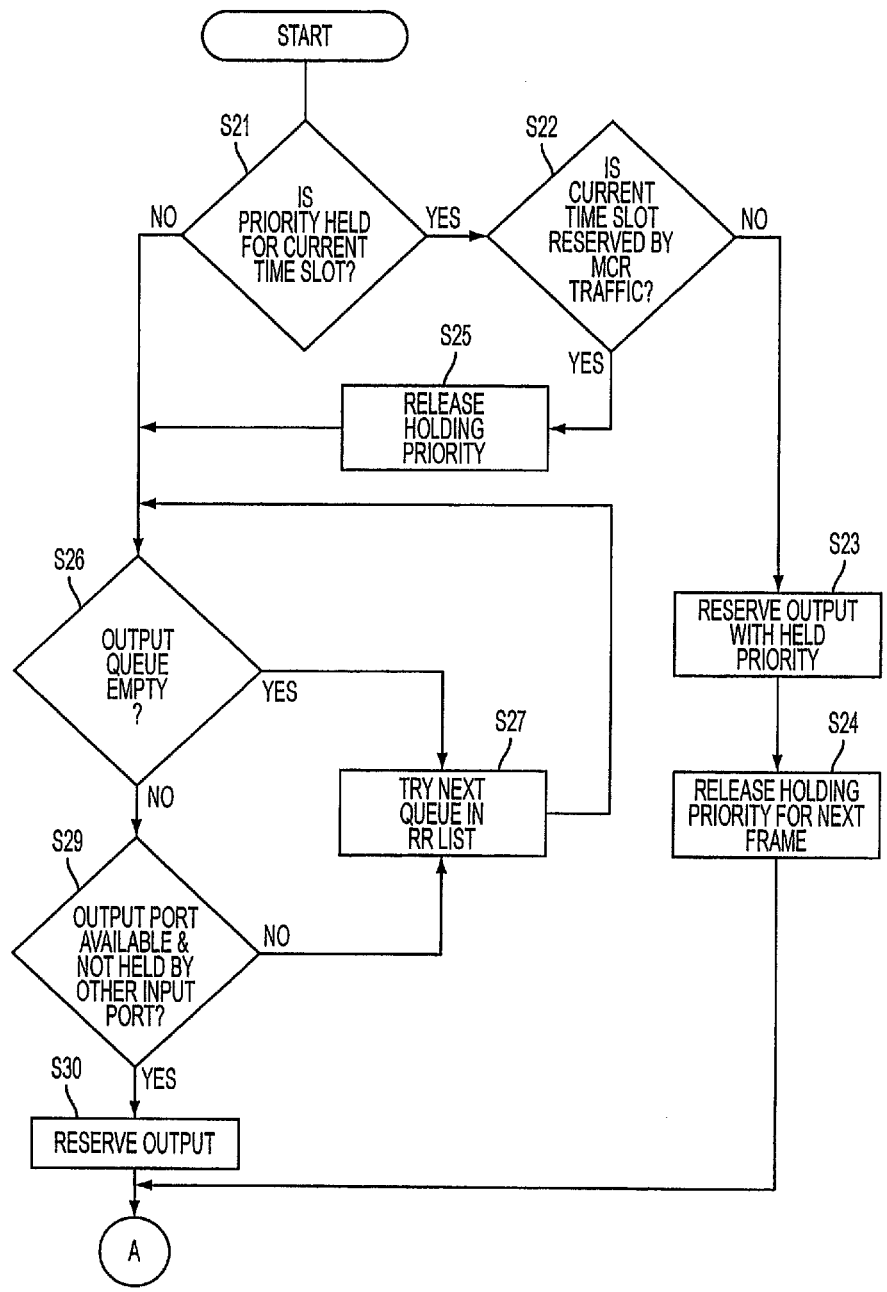
FIGS. 12(a) and 12(b) illustrate the global round robin architecture for the preferred embodiment of the present invention.
Figure 12B:
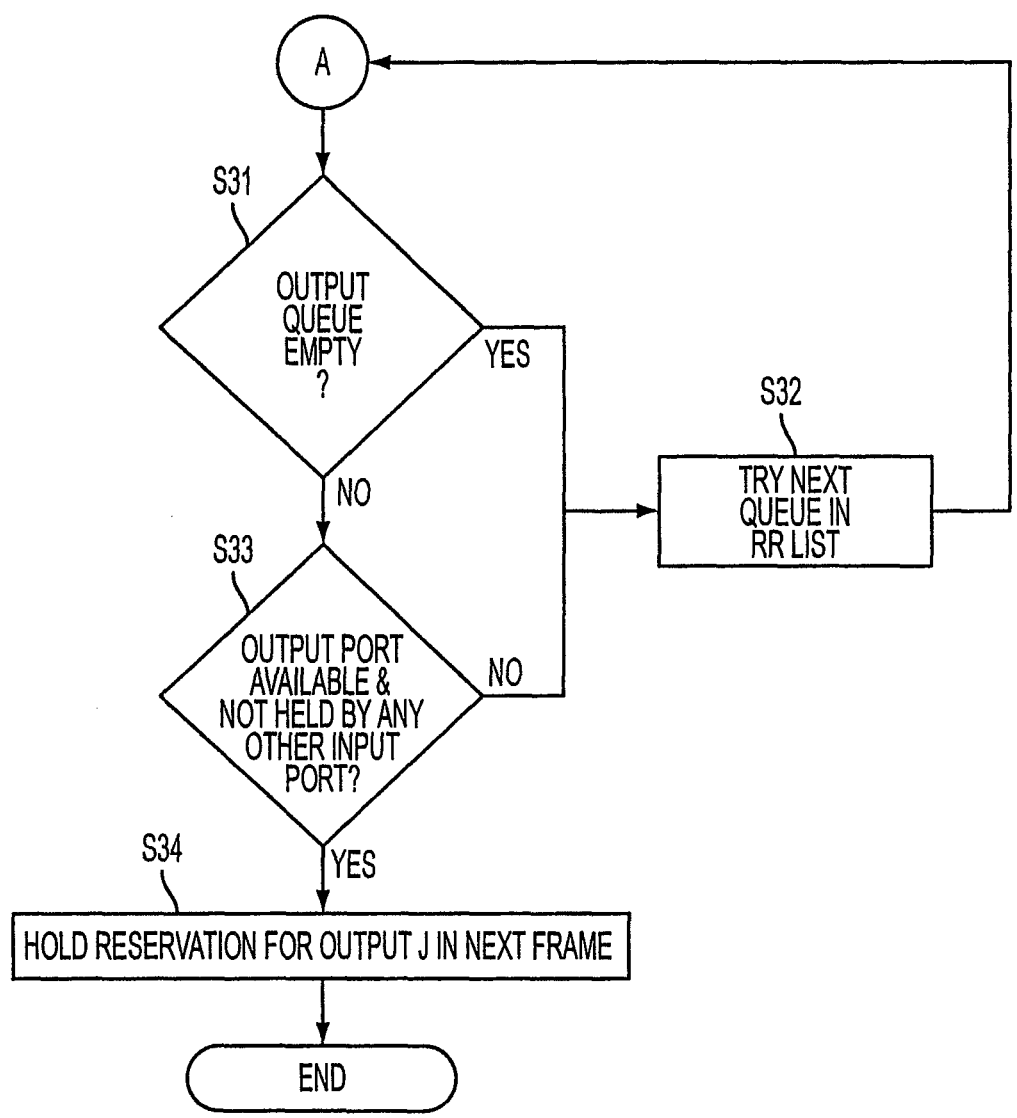

To overcome the fairness problem that relates to the output port bottleneck, the GRR algorithm of the preferred embodiment of the present invention is illustrated in FIGS. 12(a) and 12(b). In a first step S21, it is determined whether priority is held for the current time slot. If the answer is YES, then in step S22, it is determined whether the current time slot is reserved by minimum cell rate (MCR) traffic. The concept of MCR traffic will be discussed in greater detail below.

If the answer to step S22 is NO, then the output is reserved with held priority at step S23, and at step S24, holding priority for the next frame is released. However, if the answer to step S22 is NO, then the holding priority is released at step S25.

After step S25, or alternatively, if the answer to step S21 is NO, it is determined whether the output queue is empty at step S26. If the output queue is empty, then another queue is tried in the round robin list at step S27, and steps S26 and S27 are repeated until a non-empty output queue is found.

If the answer to step S26 is NO, then at step S29 it is determined whether (a) the output port is available and (b) the output port is not held by another input port. If the answer to step S29 is NO, then step S27 is performed as described in greater detail above. If the answer to step S29 is YES, then the output port is reserved at step S30.

As illustrated in FIG. 12(b), after step S30, or alternatively, step S24, has been completed, it is determined in step S31 whether the output queue is empty for the next frame. If the answer to step S31 is YES, then the next queue in the round robin list is tried at step S32, and steps S31 and S32 are repeated until a non-empty output queue for the next frame is found.

If the answer to step S31 is YES, then it is determined whether for the next frame, there is an output port that is available and not held by any other input port. If the answer to step S31 is NO, the step S32 is performed as described in greater detail above. However, if the answer to step S33 is YES, then the reservation is held for the output (i.e., J) that is in the next frame at step S34.

In an alternative embodiment of the present invention, a minimum cell rate (MCR) reservation can be made, which can block permission for reservation of the output port by an input port with held priority. Such an embodiment is described above with respect to steps S22 and S25, and also in greater below. The aforementioned alternative embodiment is performed if a particular input port has queues for many different output ports $2a \ldots 2N$, such that the particular input port must divide transmission capacity evenly among its queues, and maintain output fairness.

B. Overcoming the Input Bottleneck Problem (Dynamic Round Robin)

As also discussed in the foregoing section, the input bottleneck problem occurs when different output ports share a common input port. To overcome this problem, the Dynamic Round Robin (DRR) is applied. This section discusses the application of the DRR.

To overcome the bottleneck speed problems at the individual inputs, the DRR algorithm is applied. In the preferred method according to the present invention, a SM uses a dynamically adjusted Round-Robin list to maintain the order in which the output ports $2a \ldots 2N$ are selected by the input port. The selection and ordering processes of the Dynamic Round-Robin (DRR) list differs from the related art Round-Robin list in that a selected/served element in the list is moved to the back of the list, and the head of the list stays if it is not served.

For example, but not by way of limitation, in FIG. 11, if input port 1 has queues for output ports 1, 2, and 3, then the initial selection order of the dynamic Round-Robin list is (1, 2, 3). When output port 1 is served, then the list becomes (2, 3, 1). However, if output port 2 is served first because port 1 is blocked (i.e., reserved by other input), then the list should become (1, 3, 2) so that output port 1 still is favored to be selected in the next time frame.

C. Overcoming the Output and Input Bottleneck Problems (Global Dynamic Round Robin)

As noted in sections III.A and III.B above, the output and input bottleneck problems can be overcome separately by applying the GRR and the DRR, respectively. However, to overcome both the input as well as the output bottleneck problems at the substantially same time, a Global, Dynamic Round Robin (GDRR) solution is provided, as described in greater detail below.

Figure 13A:
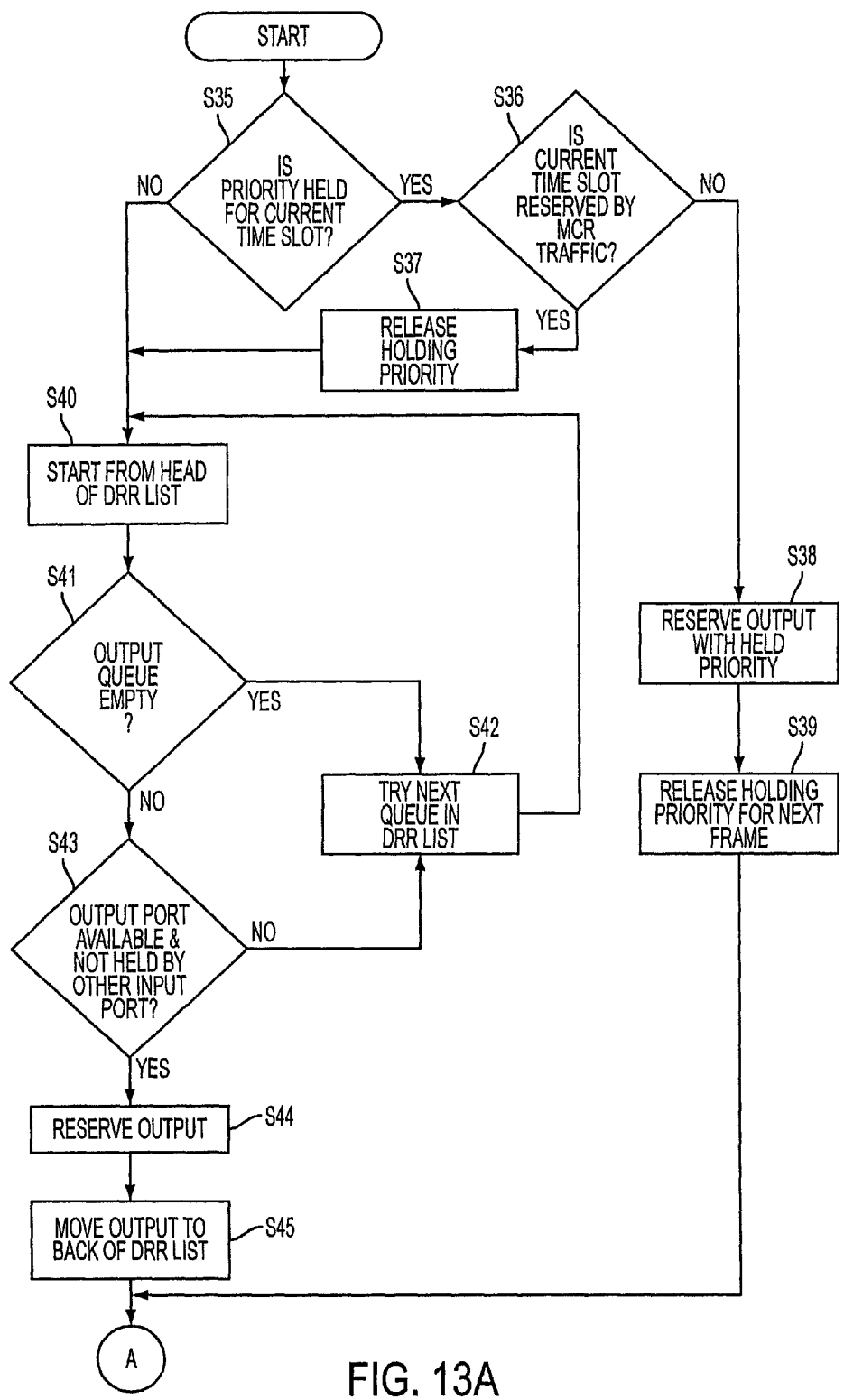
FIGS. 13(a) and 13(b) illustrate the global dynamic round robin architecture for the preferred embodiment of the present invention.
Figure 13B:
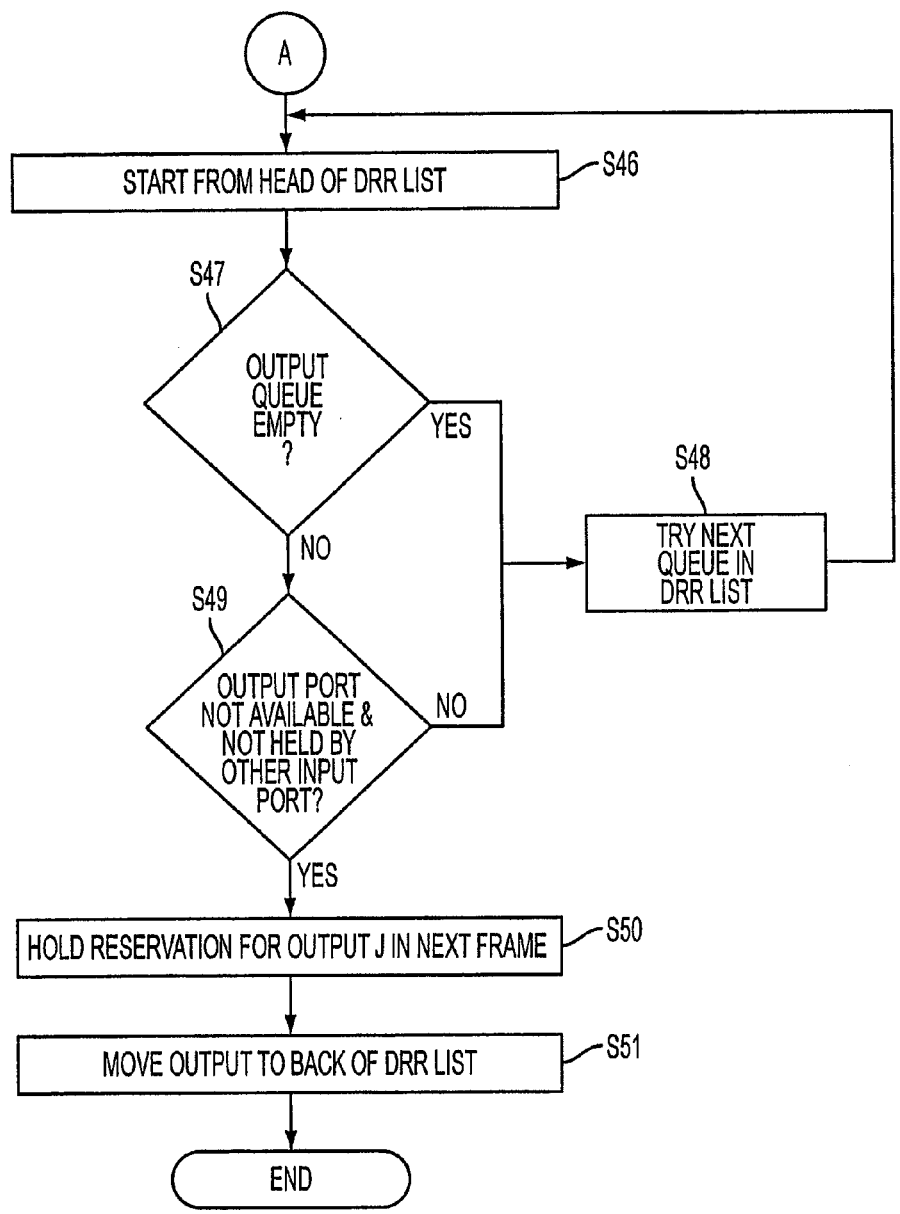

FIGS. 13(a) and 13(b) illustrate the steps of the GDRR according to the preferred embodiment of the present invention. Where indicated, the DRR and GRR methods are performed as indicated above. In a first step S35, it is determined whether priority is held for the current time slot. If the answer is YES, then in step S36, it is determined whether the current time slot is reserved by minimum cell rate (MCR) traffic, as discussed in greater detail above with respect to FIGS. 12(a) and (b), as well as further below.

If the answer to step S36 is NO, then the output is reserved with held priority at step S38, and at step S39, holding priority for the next frame is released. However, if the answer to step S36 is NO, then the holding priority is released at step S37.

After step S37, or alternatively, if the answer to step S35 is NO, the process is started from the head of the DRR list as determined by the above-described DRR process, at step S40. Then, it is determined whether the output queue is empty at step S41. If the output queue is empty, then another queue is tried in the DRR list at step S42, and steps S40-S42 are repeated until a non-empty output queue is found for the current time slot in the current frame.

If the answer to step S41 is NO, then at step S43 it is determined whether (a) the output port is available and (b) the output port is not held by another input port for the current time slot in the current frame. If the answer to step S43 is NO, then step S42 is performed as described in greater detail above. If the answer to step S43 is YES, then the output port is reserved at step S44. Next, the output for the current time slot and the current frame is moved to the back of the DRR list by the method described above with respect to the DRR algorithm, at step S45.

As illustrated in FIG. 13(b), after step S45, or alternatively, step S39, has been completed, the process starts from the head of the DRR list for the next frame at step S46. It is then determined in step S47 whether the output queue is empty for the next frame. If the answer to step S47 is YES, then the next queue in the DRR list is tried at step S48, and steps S46 and S47 are repeated until a non-empty output queue for the next frame is found.

If the answer to step S47 is YES, then it is determined whether for the next frame, there is an output port that is available and not held by any other input port at step S49. If the answer to step S49 is NO, the step S48 is performed as described in greater detail above. However, if the answer to step S33 is YES, then a reservation is held for the output (i.e., J) that is in the next frame at step S51. Next, the output for the next frame is moved to the back of the DRR list.

As noted above, in an alternative embodiment of the present invention, a minimum cell rate (MCR) reservation can be made, which can block permission for reservation of the output port by an input port with held priority.

Thus, the GDRR algorithm combines the features of the above-described GRR and DRR algorithms to provide for equal fairness by overcoming the above-described input bottleneck and output bottleneck problems in a single algorithm (i.e., GDRR). The example provided below illustrates an application of the GDRR.

D. Exemplary Description

FIGS. 14(*a*) and 14(*b*) illustrate a first example of the preferred embodiment of the present invention. In FIG. 14(*a*), a simple example of a 4×4 system is used to illustrate the details of the scheduling algorithm. In this example, Port1/SM1 has traffic to output port 2, Port2/SM2 has traffic to output port 2, Port3/SM3 has traffic to output ports 2 and 4, and Port4/SM4 has traffic to output ports 3 and 4.

In FIG. 14(*a*), SM1 makes a reservation for output port 2 for time slot 5 since port 2 was not held and is available. The <OR, P> vector changes from <0000, 0000> to <0100, 0000> due to reservation at time slot 5. The <PI, PO> vector becomes <0, 2> since port 2 is the head of the Round-Robin order. The updated <PI, PO> vector stays with SM1 at the first time slot of the current time frame, and it will be inherited by SM1 at the first time slot of the next time frame.

Also, SM2 holds reservation permission for output port 2 for time slot 9 since port 2 was reserved at time slot 5 but it is still open for holding. The <OR, P> vector changes from <0100, 0000> to <0100, 0100> due to holding at time slot 9. The <PI, PO> vector becomes <2, 2> since port 2 is the head of the Round-Robin order and input port 2 now is holding the reservation right for output port 2 at time slot 9. The third entry indicates that SM3 not only reserves output port 4 at time slot 6 but also holds permission for output port 2 at time slot 10.

Next, SM3 makes reservation for output port 4 for time slot 5 since port 2 was reserved at time slot 5 and its holding right was held at time slot 9. The <OR, P> vector changes from <0101, 0100> to <0101, 0100> due to reservation at time slot 5 for output port 4. The <PI, PO> vector becomes <0, 2>. Port 2 stays as the head of the Round-Robin order although port 4 was served first. This scheme will give port 2 preferences for the next round of scheduling process so that it will not miss its chance of being served.

FIGS. 14(*a*) and 14(*b*) indicate that both SM1 and SM2 are totally blocked, neither reserve nor hold, from doing any scheduling. Hence, the <OR, P> vector stays the same. The <PI, PO> vector becomes <0, 2>. Port 2 is the head of the Round-Robin order.

At the end of the time slot 4, the end of time frame 1, time slots 5, 6, 7, and 8 are scheduled. The scheduler slides into time frame 2 for scheduling.

Note that the OR vectors of SM1, SM2, SM3, and SM4 are set to '0's at the beginning of time frame 2, but the P vectors are inherited from SM4, SM1, SM2, and SM3 at the end of time frame 1 respectively. Both SM1 and SM2 are blocked from scheduling because some other input ports are holding the reservation rights in this time frame for time slots 5 and 6.

SM2 makes a reservation for output port 2 because SM2/*input* port 2 held the reservation right for time slot 9. Once SM2 exercises this right, it has to return this right by changing vector P from 0100 to 0000 so that other SMs can use it. In addition, PI has to be reset to '0'.

The rest of the scheduling steps illustrated in FIGS. 14(*a*) and 14(*b*) follow without further explanation, because those steps follow the same methodology discussed in greater detail above.

IV. Guaranteeing Minimum Bandwidth

A. Two-Phased Scheduling System

To give priority to conforming traffic, the two-phased scheduling approach is used. In the first phase, only conforming traffic makes reservations, while in the second phase, only non-conforming traffic makes reservations. When a cell arrives at the input buffer module, the cell is classified as conforming if it finds an unused credit in its associated credit pool. Otherwise, the cell is classified as non-conforming. Accordingly, the traffic in an aggregated flow is conforming if it does not utilize more than its allocated bandwidth. The scheduler 4 does not discard non-conforming traffic (as is done in the related art system), but instead routes non-conforming traffic so as to not conflict with conforming traffic.

Alternatively, conforming and/or non-conforming reservations may be made in the second phase. The conforming traffic is also called the Minimum Cell Rate (MCR) traffic because each Virtual Output Queue (VOQ) accumulates transmission credits at a specified minimum cell rate over time. When enough cells arrive (with the same input port and output port, and possibly, but not necessarily, having different classes) at one of the queues to construct a super-cell, the input port informs the scheduler 4 of the new arrival of a super-cell, including whether or not the super-cell is conforming.

When an arrival notification is received by the scheduler 4, the scheduler 4 increments a variable associated with the super-cell's input port, output port, and conformation status. The variables are $x_{ij}$ (for conforming super-cells) and $y_{ij}$ (for non-conforming super-cells). Note that $x_{ij}$ is actually the integer quotient of $V_{ij}/C$, and $y_{ij}$ is the integer quotient of $W_{ij}/C$. Overall, the scheduler 4 needs $2N^2$ variables. The variables are decremented when the scheduler 4 chooses super-cells to route.

The preferred embodiment of the present invention uses class-based queuing (CBQ), which supports the related art IETF-defined differentiated services (diffserv) technique. Further, bandwidth guarantee is achieved by dispensing the total transmission capacity over the flows by using a credit system that makes each flow accumulate a fraction of one super cell transmission bandwidth every time slot. When a flow accrues at least one credit, one super cell in this flow is transmitted, and the super-cell consumes that transmission credit.

The scheduler 4 need not distinguish between each of the K classes of traffic, but only stores the number of conforming and non-conforming super-cells from each input port to each output port. That is possible because the scheduler 4 views inputs as two virtual queues from each input port i to its respective output port j, wherein one of the virtual queues holds conforming traffic, and the other virtual queue holds non-conforming traffic. The scheduler 4 maintains information about sizes of the virtual queues (e.g., units of potential super-cells) and selects partial permutations for transport on this basis.

In the preferred embodiment of the present invention, each of the input ports 1*a* . . . 1N includes dedicated lines 9*a*, 9*b* to communicate with the scheduler 4, which constantly monitors the number of conforming and non-conforming super-cells in each queue. As illustrated in FIG. 4, all cells having the same input port, output port, and class are maintained in the same queue at the input port, regardless of whether they are conforming or non-conforming. However, a super-cell may contain cells from different classes, because it is only constructed based on a predefined policy after receiving a transmission grant from the scheduler 4.

The granting and requesting phases are independent of one another. Further, the input port scheduler module determines how to construct the C-cell. For example, but not by way of limitation, the C-cells can be constructed in the order in which they are sent to the output port. Also, the position of each cell in the queue is not as important as the number of conforming cells in a given queue.

Credits are maintained only at the input port queues, and the scheduler 4 has no knowledge of credits. Further, the cells within each queue at each input port need not be labeled as conforming or non-conforming. In FIG. 4, $q_{ijk}$ represents the queue for class-k traffic from input port i to output port j, $c_{ijk}$ represents the number of credits (e.g., units of cells) associated with $q_{ijk}$, and $v_{ijk}$ and $w_{ijk}$ respectively represent integers for the number of conforming cells and non-conforming cells within the queue $q_{ijk}$. When a cell arrives at a queue, it is determined whether the queue has any credits left. If $c_{ijk} >= 1$, $v_{ijk}$ is incremented and the cell is placed in the queue $q_{ijk}$. Otherwise, $w_{ijk}$ is incremented and the cell is placed in $q_{ijk}$. Thus, the cells are sent to the input port based on output port, and queues in the input port based on class.

$V_{ij}$ and $W_{ij}$ represent integers for the number of conforming cells and non-conforming cells, respectively, from input port i to output port j that the scheduler 4 has not yet been informed about, independent of class. When a new cell arrives at any of queues i to j at the input port i, either $V_{ij}$ or $W_{ij}$ is incremented. If $V_{ij}$=C, where C represents the number of cells in a super-cell (e.g., C=8), then a new conforming super-cell is constructed when a grant is given by the scheduler 4. A conforming request is sent to the scheduler 4 and C is subtracted from $V_{ij}$. Next, based on $W_{ij}$ and C, the scheduler 4 is informed of the existence of a new non-conforming potential super-cell. Requests to the scheduler 4 are made for grants based on accumulating either C conforming cells or C non-conforming cells.

When an input port receives a grant from the scheduler 4, the super-cell is constructed "on the fly" and transmitted to the scheduler 4 to the crossbar switch 5, and an arrival signal is sent to the scheduler 4. Because the input buffer knows the number of conforming and non-conforming cells in each service queue, conforming cells are added to the super-cell before non-conforming cells are considered. Further, when a cell is added to a super-cell, the added cell comes from the head of a service queue, regardless of whether that cell was originally classified as conforming.

For example, but not by way of limitation, if a queue holds three non-conforming cells, and a single conforming cell then arrives at the queue, followed by a transmission grant from the scheduler 4 (i.e., the supercell can be constructed), the supercell constructor at the input port knows that the queue has a conforming cell. To include the conforming cell, the constructor then takes the cell at the head of the queue, not the late-arriving conforming cell.

In another preferred embodiment of the present invention, a super-cell may include a mixture of conforming and non-conforming cells.

The preferred embodiment of the present invention normally selects conforming cells prior to non-conforming cells independent of class. However, certain situations exist where the super-cell constructor at the input ports 1a . . . 1N can have a preference based on classes of traffic. For example, but not by way of limitation, a fixed priority scheme (e.g. classes with lower numbers having priority) may be implemented instead of selecting conforming cells before non-conforming cells at the super cell constructor of the input ports 1a . . . 1N. Alternatively, certain "low latency" classes may be considered as a priority. As noted above, the cell discrimination based on classes occurs at the input ports 1a . . . 1N, not the scheduler 4.

B. Exemplary Description

Figure 15:
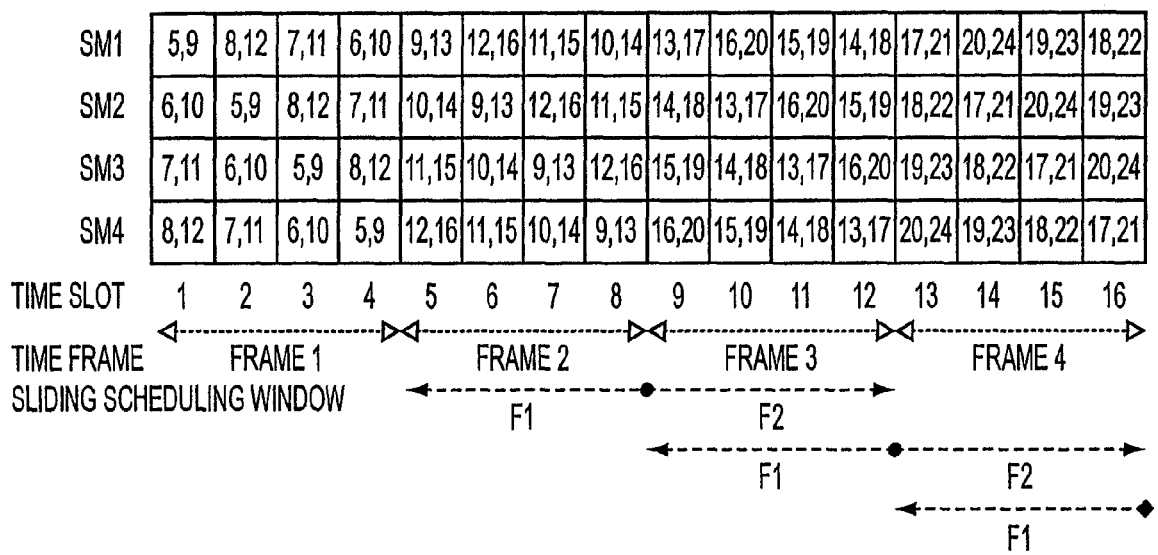
FIGS. 15 and 16 illustrate an application of the two-phase MCR solution according to the preferred embodiment of the present invention.

As illustrated in FIG. 15, the two-phase MCR scheduling fits well with the 2 frame scheduling window, as each SM needs to schedule 2 different time slots at a time: one for MCR, and the other for fairness. The order that each SM processes its requests is to a) make reservation for the previously held permission or make reservation for the non-conforming traffic in the dynamic Round-Robin order in F1 part of the scheduling window, b) make reservation for conforming traffic—MCR traffic, c) release the previously held permission if it were blocked again by a MCR traffic or hold the reservation right for the output port that is at the head of the dynamic Round-Robin list.

Thus, a new vector $ORM_{kj}$ for $1<j<N$ and $1<k<M$ is needed to indicate which output ports 2a . . . 2N have already been reserved for a given position of time slot k in the future time frame: "1" indicates reserved, "0" indicates not reserved. It is initialized to all 0's at the beginning of each time frame. Also, $OR_{kj}$ now inherits the $ORM_{kj}$ information at the beginning of each time frame instead of being initialized 0.

As illustrated in FIG. 15, during time Frame 1, each SM schedules fairness traffic for F1 part—Frame 2, and MCR traffic for the F2 part—Frame 3, of the scheduling window 11. Then, as the scheduler slides the window 11 one frame ahead—to Frame 2, the SMs will schedule fairness traffic for Frame 3—$OR_{2j}$ inherits $ORM_{2j}$ information, and MCR traffic for Frame 4. Each box in the window 11 represents that one SM is processing 2 different time slots in 2 different time frames. For example, at time slot 1, SM1 is scheduling fairness traffic for time slot 5 at Frame 2 and MCR traffic for time slot 9 at Frame 3. Since any fresh time frame is always scheduled for MCR traffic first, MCR guarantee can be achieved. Of course, an addition reservation ORM is needed to carry this information among the SMs. Although the throughput of the scheduler stays the same, the latency of the scheduler is doubled.

Figure 14A:
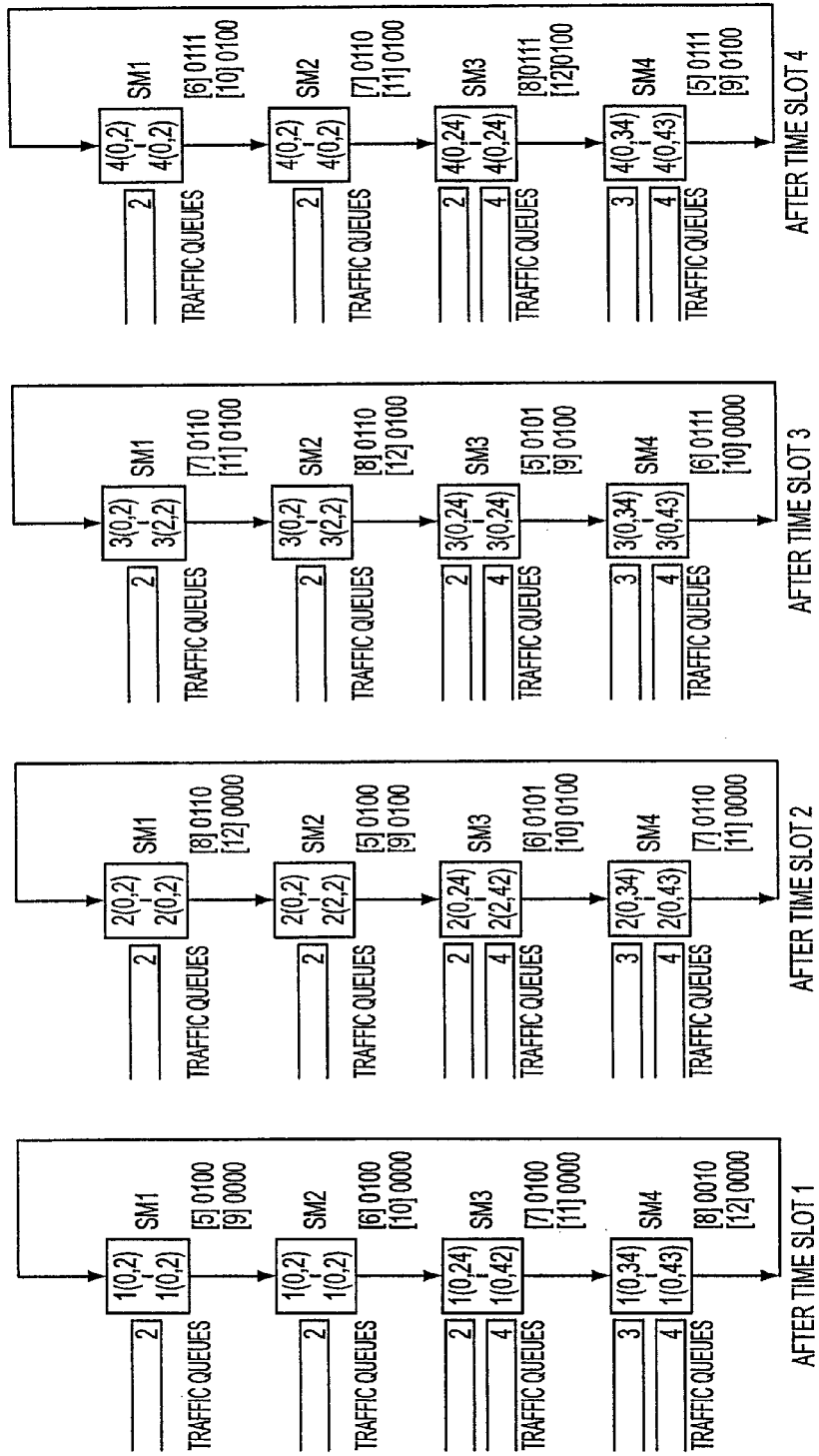
FIGS. 14(a) and 14(b) illustrate an example of the fairness solution according to the preferred embodiment of the present invention.
Figure 14B:
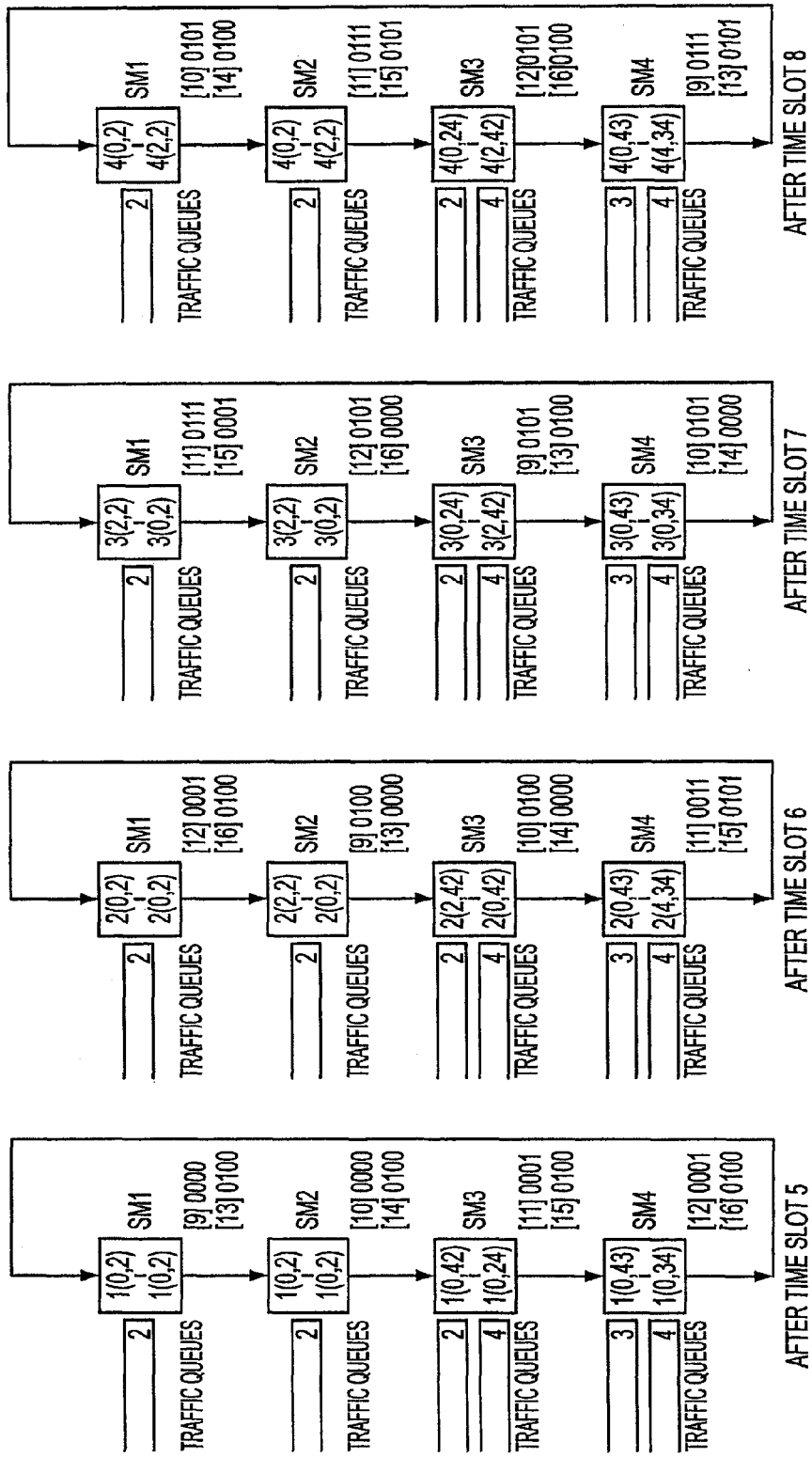
Figure 16:
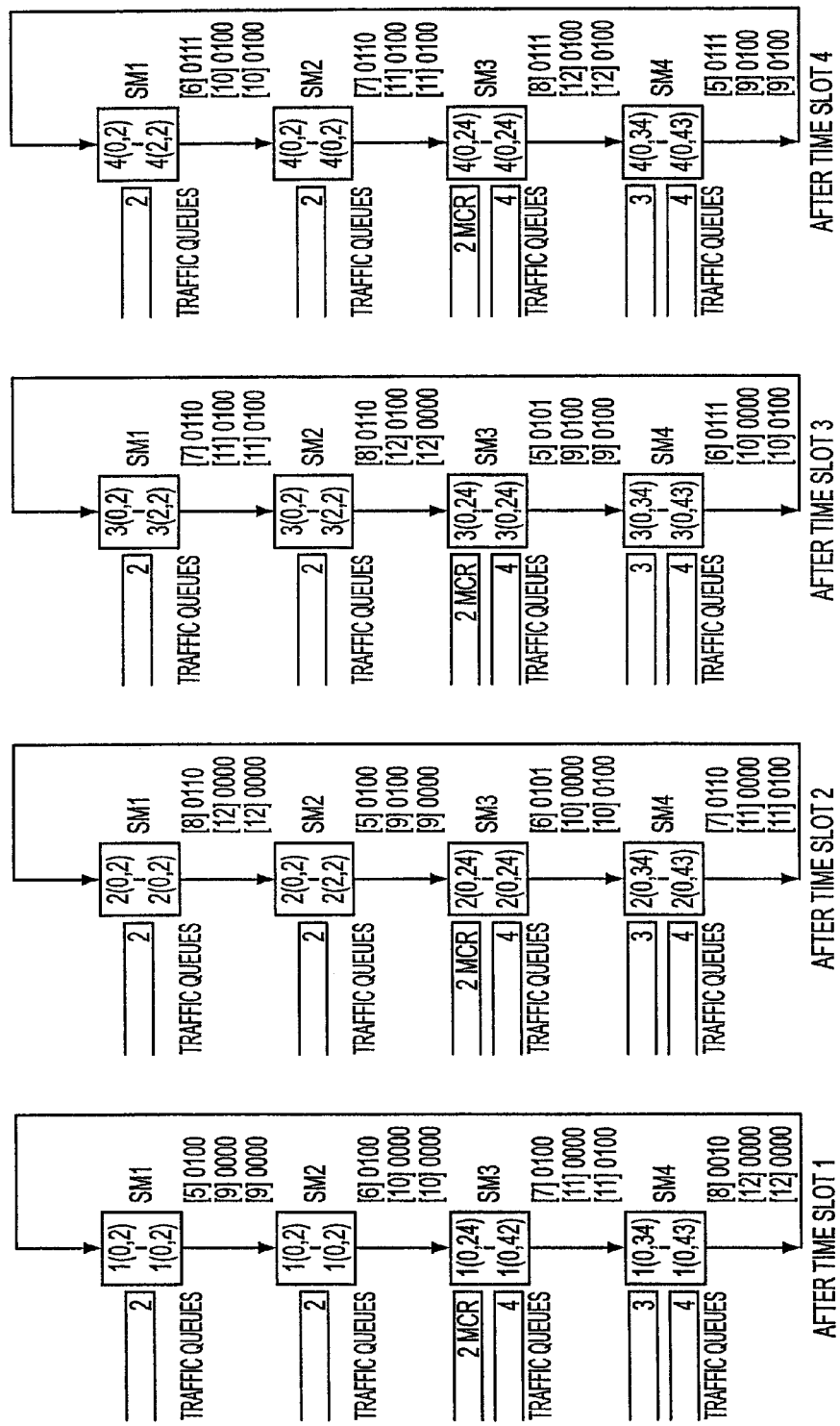

FIG. 16 illustrates an example similar to FIGS. 14(a) and 14(b), with MCR and guaranteed traffic for conforming cells. In this two-phase approach, the scheduler makes and holds reservations only for conforming cells in frame 1, and then makes and holds reservations for conforming as well as non-conforming cells in frame 2. AT TS1, SM3 (output 2) meets the MCR requirements, and thus has a conforming cell. As a result, SM3 no longer holds a reservation for TS 11 (output 2). The reservation is given up, because it no longer needs to reserved for a conforming cell. Thus, a non-conforming cell may reserve output 2, TS11, as is done at TS3 by SM1.

In FIG. 16, the same example illustrated in FIGS. 14(a) and 14(b) is used, except that the traffic from input port 3 to output port 2 is MCR guaranteed. Another vector ORM is added to the set that were passed among the SMs. The status of the ORM vector at the end of a time frame will initialize the OR vector at the beginning of the next time frame so that MCR traffic will be given priority. In addition, those "held permission of reservation" ports will have to be released if preempted by a MCR reservation in the same time frame.

Additionally, at time slot 2, SM3 makes reservation for output 4 at time slot 6 because port 2 was blocked. However, SM3 can not hold the reservation right for port 2 at time slot 10, because the slot was used by the MCR traffic. Further, at time slot 3, SM1 holds the reservation right for output port 2 for time slot 11 anyway although this slot was reserved already by some other SM, because SM1 does not check the status of ORM while attempting to hold a reservation right. Thus, the held reservation right is released by input port 1 at time slot 11, when SM1 tries to exercise that right. Alternatively, SM3 makes a MCR reservation for output port 2 for time slot 9, although port 2's reservation right was held by SM2 at time slot 2, which forces SM2 to release its held right when time when SM2 tries to exercise its right later.

Each output port will have two lines to signal the scheduler 4, as shown schematically in FIG. 1. One line will signal "stop non-conforming traffic only." The other line will signal "stop both conforming and non-conforming traffic." When an output port senses an oncoming overflow, it can assert one line or the other. Again, the CAC should have ensured that the output port (and output lines) could support all conforming traffic, thus requesting a halt to non-conforming traffic only should normally suffice. Frequent request to stop all traffic to an output port probably indicates that tuning of the CAC is necessary.

A further alternative embodiment of combining the fairness and bandwidth guarantee scheduling involves having the input port that previously held a preempted permission of reservation by a MCR scheduling continue to have priority to hold permission of reservation of the same output port again. This alternative ensures input fairness for a given output port regardless of whether MCR scheduling is present.

V. Multicasting and Back-Pressure

The preferred embodiment of the present invention places a copy of the multicast datagram into each desired unicast queue. Copies of the datagram are not made until absolutely necessary. For example, but not by way of limitation, if a multicast datagram is destined for two different output ports, then a datagram is copied into the corresponding relevant queues at the input port. However, if a multicast datagram is destined for two output lines connected to the same output port, only one copy of the datagram is sent to the output port, but at the output port the datagram is copied and put into the corresponding output line queues. In an ATM or MPLS context, it may be desirable to send multiple copies of a multicast datagram over the same output line. The aforementioned scheme would be handled similarly at the output port.

For example, but not by way of limitation, if a multicast cell arrived at input i with destinations j, k, and l, a copy is placed in all three relevant queues. While there is an extra cost in this approach that includes the maintenance of multiple copies of multicast cells at the input ports $1a \ldots 1N$, this approach has the benefit of being able to use simple unicast schedulers. This approach is a simple extension of the unicast bandwidth guarantees, and conforms to the "maximum load" guaranteed bandwidth approach described earlier, and is therefore easy for the CAC to handle. For example, but not by way of limitation, the flow described above would require reserved bandwidth for the relevant class from i to j, i to k, and i to l.

Core switch support for certain issues associated with the switch interface, includes (i) the reconstruction of datagrams at the output, and (ii) back-pressure signals from the output port to the scheduler.

In the basic switch model, IP datagrams are partitioned into cells at the input of the crossbar switch 5, and cells are concatenated back into datagrams at the output. In the preferred embodiment of the present invention, associated with each input port are 8 input lines, and associated with each output port are 8 output lines. The sum of the capacity of the lines connected to a port is approximately equal to the overall capacity of the port. To be specific, we assume the input (output) lines can support 2.4 Gbs, and that input (output) ports can support 20 Gbs.

Figure 17:
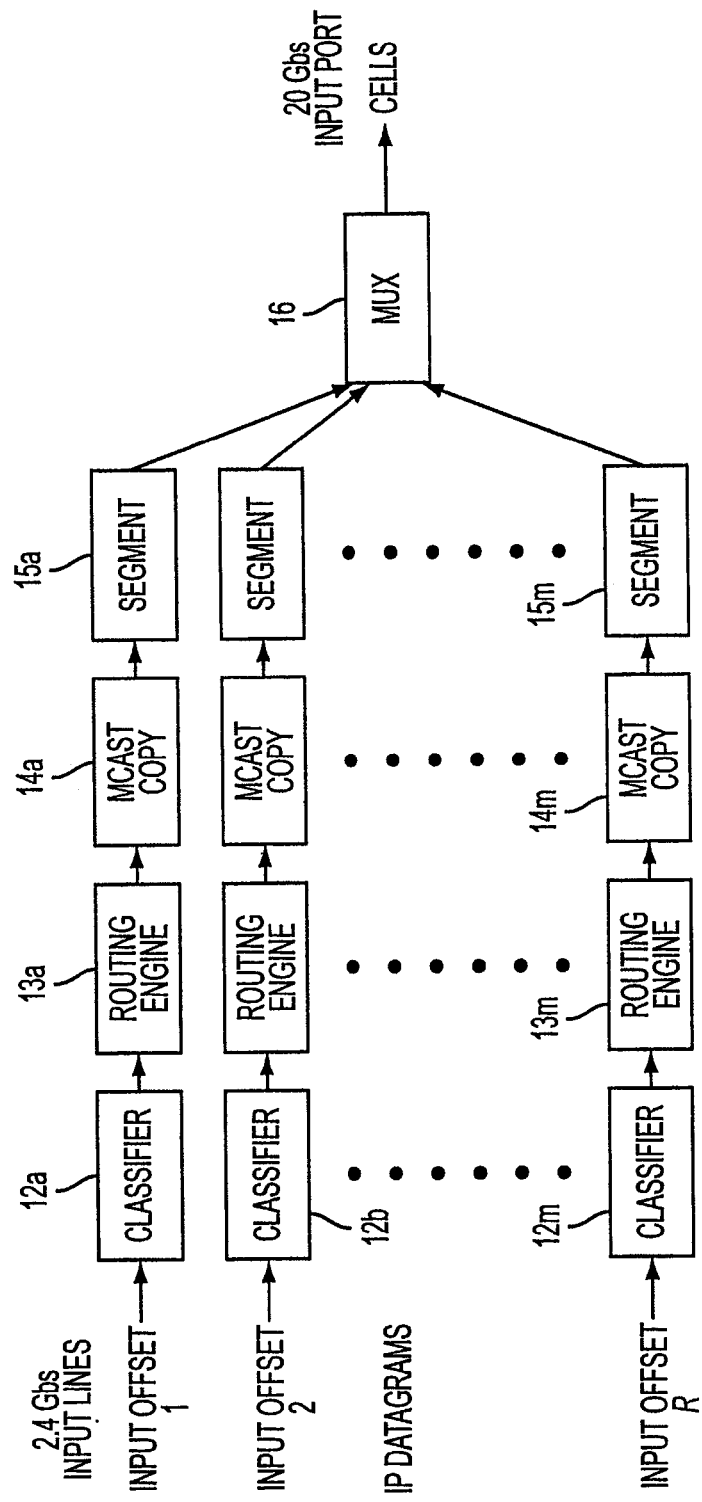
FIG. 17 illustrates handling of multicasting at the input ports according to the preferred embodiment of the present invention.

Different datagrams can enter an input port simultaneously from the different lines, as shown in FIG. 17. When a datagram arrives, its class is determined, and the next hop is determined. If necessary, multicast copies are created as described above, with a distinct copy being made for each distinct output port, and the datagrams are segmented into cells. The cells are then multiplexed into a single flow. Datagrams arriving at a particular input line are routed sequentially (i.e. no interleaving of cells from datagrams arriving at the same line).

Figure 18:
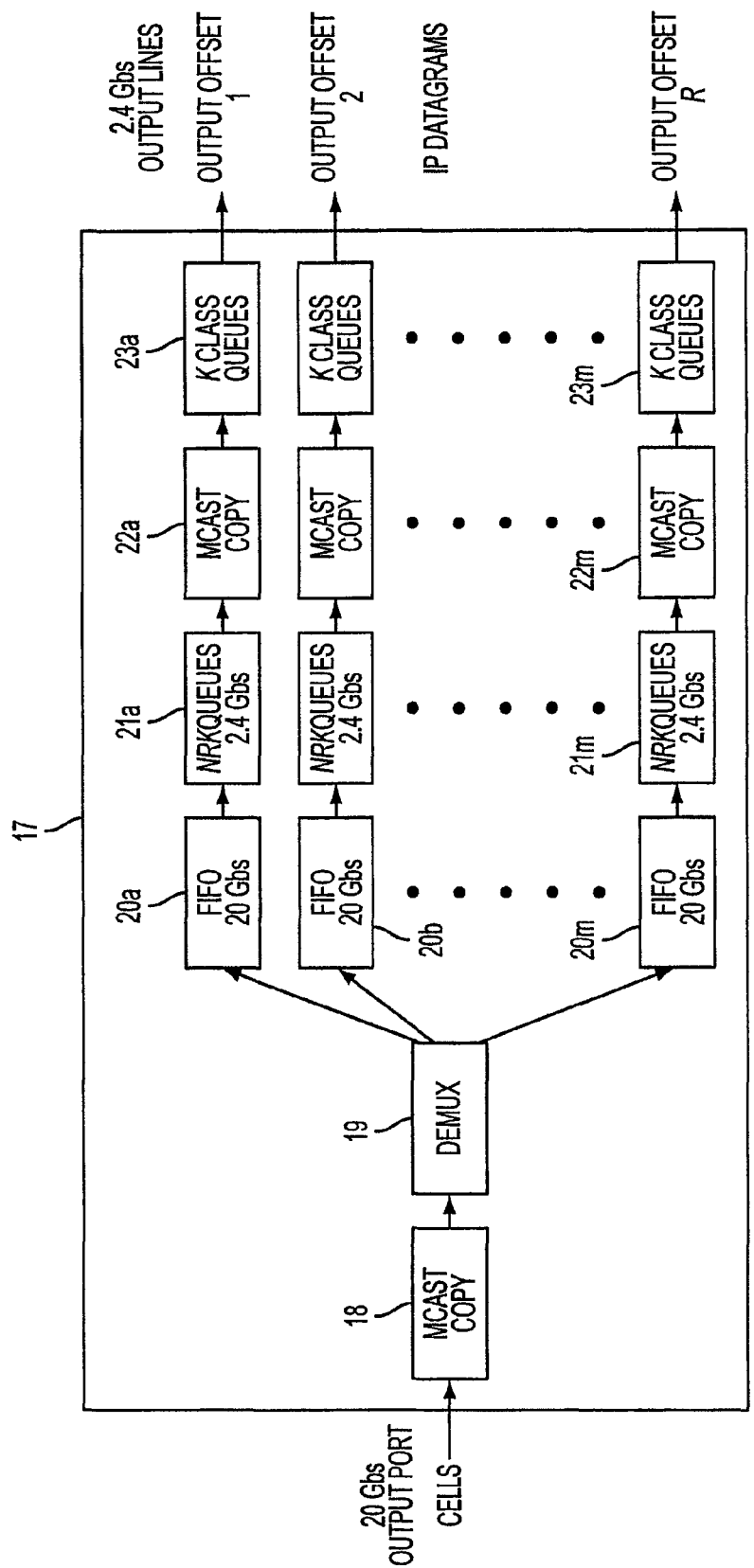
FIG. 18 illustrates handling of multicasting at the output ports according to the preferred embodiment of the present invention.

FIG. 18 shows the design of the output line interface. First, multicast copies are made if multiple output lines are on the multicast route, which is somewhat complicated by the fact that the datagrams have not yet been assembled. Then, demultiplexing is required to route each datagram to the appropriate output line. Because each output line may simultaneously be constructing 8NK datagrams in the worst case, 8NK queues are needed to reconstruct the datagrams. Multicast copying again takes place to handle ATM and MPLS environments. Then, the datagrams are queues again according to class before being sent on the output line.

The switch 5 must provide sufficient information to enable the output ports $2a \ldots 2N$ to properly reconstruct the datagrams. The output port needs to know the input line (i.e., the input port and input offset) the output offset, and the class of each cell, which is overhead information that is sent in a header that accompanies each cell going through the switch 5. FIG. 3 shows a super-cell, including overhead labeling information.

Since the C cells in each super-cell may have different input offset, output offset, and class, each cell requires 3 labels. Since there are R offsets per port and K classes, this amounts to $C*(2 \log R + \log K)$ bits per super-cell. Additionally, while the input port must be known, all cells in a super-cell will have the same input port. Thus, the number of bits to label the common input port is $\log N$, and the total number of overhead bits per super-cell is $C*(2 \log R + \log K) + \log N$.

Since an output line has less capacity than an output port, there is a need for queuing at the output ports. The CAC ensures that no output line supports conforming traffic greater than the capacity of that output line. However, non-conforming traffic can overtake the capacity of a single input line. For example, but not by way of limitation, an output port receives non-conforming traffic at a rate of 20 Gbs, all destined for the same output line that can handle only 2.4 Gbs.

Though the crossbar switch 5 cannot be stable for such a load over a long period of time, bursty traffic is supported. A number of excess buffers is located at each output port. In addition, an output port can request a slow-down or even halt traffic by signaling the scheduler. By using this back-pressure technique, the buffers at both the input ports $1a \ldots 1N$ and the output ports $2a \ldots 2N$ can support such traffic bursts.

Changing the scheduler design to support back-pressure requests is logically straightforward. However, a naïve related art implementation of the proposed scheme has a scalability problem, since each of the M scheduling modules will need to know all output ports $2a \ldots 2N$ requesting back-pressure. Certainly, 2N additional pins on each scheduling module cannot be afforded. Additionally, several implementation schemes are possible, from pipelining back-pressure information between scheduling modules, to broadcasting only changes in back-pressure status.

VI. Advantages

The present invention has various advantages over the prior art. For example, but not by way of limitation, the method of scheduling and reservation according to the preferred embodiment of the present invention has an improved speed. As noted above, the preferred embodiment of the present invention uses a pipeline technique with simple operations in each stage, and a throughput of one partial set of selection of input-output connections per time slot is achieved. Further, minimum bandwidth is guaranteed using the two-phase scheduling system according to the preferred embodiments of the present invention.

Additionally, it is an advantage that the preferred embodiment of the present invention supports multiple classes of traffic, each class having its own QoS. Each class is provided with credits, and new credits are generated at a rate equal to the guaranteed bandwidth for the class. Cells with credits have high priority, and can make reservations in the first phase of the scheduling algorithm. As noted above, the CAC determines the amount of bandwidth that can be guaranteed to each class. By controlling bandwidth allocation, different classes are provided with different QoS.

Another advantage is that the preferred embodiment of the present invention also supports non-conforming (i.e., best-effort) traffic. Classes that send traffic higher than their guaranteed rate will not have enough credits for all the cells therein, and cells without credits can make reservations only in the second phase of the scheduling algorithm.

Further, it is another advantage of the present invention that input and output ports are treated fairly. Also, the present invention has an advantage in that the scheduler is work-conserving. In each time slot, a maximal set of queues is serviced. Also, fairness between ports is ensured (e.g., equal fairness or weighted fairness for certain ports). The fairness problem is further alleviated by holding reservation priority.

The present invention also provides a scalable design. Increasing the number of classes supported does not affect the scheduler design but incurs a small extra cost at the input ports $1a \ldots 1N$, which must maintain more queues.

Additionally, the preferred embodiment of the present invention has a high degree of scalability for at least two reasons. First, increasing the number of supported classes does not increase the complexity of the scheduler, because the scheduler only needs to differentiate between conforming and non-conforming traffic. Thus, only the CAC and the input ports $1a \ldots 1N$ handle the provision of different services to different classes. Second, increasing the number of input or output ports $2a \ldots 2N$ does not adversely affect the throughput of the scheduler 4.

The present invention is also more efficient. For example, but not by way of limitation, the preferred method of informing the scheduler 4 of arrivals of potential super-cells according to the present invention is more efficient than the related art method of sending the scheduler 4 the full status information at every time slot. If the scheduler 4 according to the preferred embodiment of the present invention needs to know about the existence of conforming and non-conforming super-cells from input port i to output port j, the "full status" related art approach requires at least 2N bits for communication between each input port module and the scheduler for each slot, which results in a total of $2N^2$ bits. In contrast, if the "arrival signal" method of the preferred embodiment of the present invention is used, only ($\log_2 N+1$) communication bits are needed for each input port bit (i.e., to indicate the output port number and the conforming information), resulting in a total of N ($\log_2 N+1$) bits.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A non-transitory computer-readable medium comprising:
   one or more instructions which, when executed by one or more processors of a network device, cause the one or more processors to:
   receive each data unit, of a plurality of data units associated with a particular quality of service (QoS) class, at an input port of the network device,
   determine, for each data unit, of the plurality of data units, whether the data unit comprises the first type of data unit or the second type of data unit based on an amount of bandwidth available for transporting data through a network device when the data unit is received at the input port of the network device,
   buffer the plurality of data units, associated with, in a queue associated with the particular QoS class,
   determine that a predetermined number of data units comprising the first type of data unit or a predetermined number of data units comprising the second type of data unit are buffered in the queue,
   generate a request for constructing a data segment, the data segment including the predetermined number of data units comprising the first type of data unit or the predetermined number of data units comprising the second type of data unit,
   receive a grant to construct the data segment based on the request,
   construct the data segment based on the grant.

2. The non-transitory computer-readable medium of claim 1, further comprising:
   one or more instructions which, when executed by the one or more processors, cause the one or more processors to:
   determine that the plurality of data units are associated with the particular QoS class and a particular output port, and
   buffer the plurality of data units in the queue based on the plurality of data units being associated with the particular QoS class and the particular output port.

3. The non-transitory computer-readable medium of claim 1, where the one or more instructions to buffer the plurality of data units include:
   one or more instructions which, when executed by the one or more processors, cause the one or more processors to:
   determine whether each data unit, of the plurality of data units, comprises the first type of data unit or the second type of data unit, and
   buffer each data unit, of the plurality of data units, in a first portion of the queue when the data unit comprises the first type of data unit and in a second portion of the queue when the data unit comprises the second type of data unit, the second portion of the queue being different from the first portion of the queue.

4. The non-transitory computer-readable medium of claim 1, further comprising:
   one or more instructions which, when executed by the one or more processors, cause the one or more processors to:
   determine a first quantity of data units, of the plurality of data units, that conform to a minimum cell rate,
   determine a second quantity of data units, of the plurality of data units, that do not conform to the minimum cell rate, and
   determine that the predetermined number of data units comprising the first type of data unit or the predetermined number of data units comprising the second type of data unit are buffered in the queue based on the determined first quantity or the determined second quantity.

5. The non-transitory computer-readable medium of claim 1, further comprising:
   one or more instructions which, when executed by the one or more processors, cause the one or more processors to:
   receive a data segment, determine that the data segment is associated with the particular QoS class, and
segment the data segment into the plurality of data units based on the data segment being associated with the particular QoS class.

6. The non-transitory computer-readable medium of claim 1, further comprising:
one or more instructions which, when executed by the one or more processors, cause the one or more processors to:
transmit the constructed data segment to a crossbar switch via a first output port associated with the queue when the constructed data segment includes the predetermined number of data units comprising the first type of data unit, and
transmit the constructed data segment to the crossbar switch via a second output port associated with the queue when the constructed data segment includes the predetermined number of data units comprising the second type of data unit, the second output port being different from the first output port.

7. The non-transitory computer-readable medium of claim 1, further comprising: one or more instructions which, when executed by the one or more processors, cause the one or more processors to: update an amount of bandwidth allocated to transmit data through the network device only when a data unit is received at the input port of the network device.

8. A device comprising:
a processor to:
receive an initial allocation of a first quantity of credits for transmitting data through the device,
set a first variable to a first value based on the first quantity of credits,
set a second variable to a second value based on time associated with receiving the initial allocation of the first quantity of credits,
receive a data unit,
determine, based on the second variable, a quantity of time slots that have occurred since receiving the initial allocation of the first quantity of credits,
determine, based on the determined quantity of time slots, an additional quantity of credits,
determine, based on the additional quantity of credits and the first quantity of credits, a second quantity of credits,
set the first variable to a third value based on the second quantity of credits, and
determine whether to transmit the received data unit through the device based on the third value.

9. The device of claim 8, where the processor is further to:
set the second variable to a fourth value based on a time associated with receiving the data unit,
receive a second data unit,
determine, based on the fourth value, a second quantity of time slots that have occurred since determining the additional quantity of credits, and
determine, based on the second quantity of time slots, a second additional quantity of credits for transmitting the second data unit through the device.

10. The device of claim 9, where the processor is further to:
set the first variable to a fifth value based on a size of the received data unit when the received data unit is transmitted through the device,
determine, based on the second additional quantity of credits and the fifth value, a third quantity of credits,
set the first variable to a sixth value based on the third quantity of credits, and
determine whether to transmit the second data unit through the device based on the sixth value.

11. The device of claim 8, where the processor is further to:
determine that the received data unit comprises a conforming data unit based on the third value, and
store the received data unit in a first virtual queue of a buffer based on the received data unit comprising the conforming data unit.

12. The device of claim 11, where the processor is further to:
determine that a particular quantity of conforming data units are stored in the first virtual queue,
construct a data segment including the particular quantity of conforming data units based on determining that the particular quantity of conforming data units are stored in the first virtual queue, and
transmit the constructed data segment to a particular output port of the device.

13. The device of claim 12, where the processor is further to:
generate a request for constructing the data segment based on determining that the particular quantity of conforming data units are stored in the first virtual queue,
transmit the request to a scheduling component of the device, and
receive, from the scheduling component, a grant to construct the data segment, where the data segment is constructed based on receiving the grant.

14. The device of claim 12, where each of the particular quantity of conforming data units are associated with a particular quality of service and a particular input port of the device.

15. A method comprising:
receiving, by a network device, a first quantity of credits for transmitting data through the network device;
determining, by the network device, a value for a first variable based on the first quantity of credits;
determining, by the network device, a value for a second variable based on a time associated with receiving the first quantity of credits;
receiving, by the network device, a data unit;
determining, by the network device and based on the second variable, a quantity of time slots occurring since receiving the first quantity of credits;
determining, by the network device and based on the determined quantity of time slots, a second quantity of credits;
determining, by the network device and based on the second quantity of credits and the first quantity of credits, a third quantity of credits;
setting, by the network device, the value of the first variable to a second value based on the third quantity of credits; and
determining, by the network device, whether to transmit the received data unit through the network device based on the second value.

16. The method of claim 15, further comprising:
updating the value of the second variable based on a time associated with receiving the data unit.

17. The method of claim 16, further comprising:
setting the value of the first variable to a third value based on a size of the received data unit when the received data unit is transmitted through the network device;
receiving a second data unit;
determining, based on the updated second variable, a second quantity of time slots occurring since receiving the data unit;

determining, based on the second quantity of time slots, a fourth quantity of credits;

determining, based on the fourth quantity of credits and the third value, a fifth quantity of credits;

setting the value of the first variable to a fourth value based on the fifth quantity of credits; and determining whether to transmit the second data unit through the network device based on the fourth value.

18. The method of claim 15, further comprising:

determining that the received data unit comprises a non-conforming data unit based on the second value of the first variable; and storing the received data unit in a first virtual queue of a buffer based on the received data unit comprising the non-conforming data unit.

19. The method of claim 18, further comprising:

determining that a particular quantity of non-conforming data units are stored in the first virtual queue;

generating a request for constructing the data segment based on determining that the particular quantity of non-conforming data units are stored in the first virtual queue;

transmitting the request to a scheduling component of the network device;

receiving, from the scheduling component, a grant to construct the data segment;

constructing a data segment including the particular quantity of non-conforming data units based on receiving the grant; and transmitting the constructed data segment to a particular output port of the network device.

\* \* \* \* \*